United States Patent
Xu et al.

(10) Patent No.: US 12,414,199 B2
(45) Date of Patent: Sep. 9, 2025

(54) METHOD AND APPARATUS FOR MOBILITY MANAGEMENT IN WIRELESS COMMUNICATION SYSTEM

(71) Applicant: LG Electronics Inc., Seoul (KR)

(72) Inventors: Jian Xu, Seoul (KR); Daewook Byun, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 663 days.

(21) Appl. No.: 17/608,638

(22) PCT Filed: May 4, 2020

(86) PCT No.: PCT/KR2020/005897
§ 371 (c)(1),
(2) Date: Nov. 3, 2021

(87) PCT Pub. No.: WO2020/226398
PCT Pub. Date: Nov. 12, 2020

(65) Prior Publication Data
US 2022/0232433 A1 Jul. 21, 2022

(30) Foreign Application Priority Data
May 3, 2019 (KR) .......................... 10-2019-0052191

(51) Int. Cl.
*H04W 76/36* (2018.01)
*H04W 36/00* (2009.01)
(Continued)

(52) U.S. Cl.
CPC ....... *H04W 76/36* (2018.02); *H04W 36/0061* (2013.01); *H04W 76/27* (2018.02); *H04W 92/20* (2013.01)

(58) Field of Classification Search
CPC ......... H04W 36/0069; H04W 36/0061; H04W 76/36; H04W 92/20; H04W 36/18; H04W 36/185; H04W 36/362; H04W 76/27
See application file for complete search history.

(56) References Cited

U.S. PATENT DOCUMENTS

2016/0373972 A1* 12/2016 Vesely .............. H04W 36/0027
2017/0311211 A1* 10/2017 Chiba ............... H04W 36/0069
(Continued)

FOREIGN PATENT DOCUMENTS

WO WO-2018127017 A1 * 7/2018 ............ H04W 24/02
WO WO-2020048479 A1 * 3/2020 .......... H04W 36/185

OTHER PUBLICATIONS

Huawei et al., Procedure analysis of DC-based handover (R2-1903563), Mar. 29, 2019, 3GPP TSG-RAN WG2 #105bis, whole document (Year: 2019).*

(Continued)

*Primary Examiner* — Michael Thier
*Assistant Examiner* — Jose L Perez
(74) *Attorney, Agent, or Firm* — Fish & Richardson P.C.

(57) ABSTRACT

A method performed by a central unit (CU) in a first radio access network (RAN) node comprises: establishing a dual connectivity (DC) of the first RAN node and a second RAN node for a wireless device; providing a service to the wireless device in the DC based on a distributed unit (DU) of the first and second RAN nodes; receiving, from a CU of the second RAN node in the DC, handover information for a handover of the wireless device from the second RAN node to the first RAN node; performing a packet data convergence protocol (PDCP) anchor change from the CU of the second RAN node to the CU of the first RAN node based on the handover information; and transmitting, to the DU of the first RAN node, a message comprising informa- (Continued)

tion instructing not to release the DU of the first RAN node after the PDCP anchor change.

11 Claims, 22 Drawing Sheets

(51) Int. Cl.
*H04W 76/27* (2018.01)
*H04W 92/20* (2009.01)

(56) References Cited

U.S. PATENT DOCUMENTS

| | | | |
|---|---|---|---|
| 2017/0374591 | A1 | 12/2017 | Xu et al. |
| 2018/0083688 | A1* | 3/2018 | Agiwal ................. H04M 3/537 |
| 2018/0367288 | A1* | 12/2018 | Vrzic .................... H04L 12/403 |
| 2019/0253945 | A1* | 8/2019 | Paladugu ........... H04W 12/0433 |
| 2019/0327647 | A1* | 10/2019 | Ozturk ................. H04W 12/10 |
| 2020/0084808 | A1* | 3/2020 | Oak ...................... H04L 69/321 |
| 2020/0120572 | A1* | 4/2020 | Fiorani ................. H04W 36/06 |
| 2020/0154330 | A1* | 5/2020 | Paladugu ............. H04W 36/30 |
| 2020/0178332 | A1* | 6/2020 | Sharma ................ H04W 76/19 |
| 2021/0168674 | A1* | 6/2021 | He ...................... H04W 36/0069 |
| 2021/0176676 | A1* | 6/2021 | Yang ................. H04W 36/0083 |
| 2021/0176802 | A1* | 6/2021 | Sirotkin ............. H04W 88/085 |
| 2021/0352639 | A1* | 11/2021 | Futaki ..................... H04L 5/001 |
| 2022/0014989 | A1* | 1/2022 | Zhang ................... H04W 36/02 |
| 2022/0053598 | A1* | 2/2022 | Peng ............... H04W 36/00698 |
| 2022/0070740 | A1* | 3/2022 | Futaki ................... H04W 36/08 |
| 2024/0073738 | A1* | 2/2024 | Shimoda ............... H04W 80/08 |

OTHER PUBLICATIONS

Geng et al., "Communication Method and Network Device" (WO 2018127017 A1), Jul. 12, 2018, EPO website English translation, whole document (Year: 2018).*

Huawei, HiSilicon, "DC based scheme for 0ms interruption handover," R2-1900705, Presented at 3GPP TSG-RAN WG2 #105, Athens, Greece, Feb. 25-Mar. 1, 2019, 4 pages.

Huawei et al., "Comparison of DC-based and non-DC-based handover solution," R2-1905208, Presented at 3GPP TSG-RAN WG2 #105bis, Xi'an, China, Apr. 8-12, 2019, 8 pages.

Huawei et al., "Procedure analysis of DC-based handover," R2-1903563, Presented at 3GPP TSG-RAN WG2 #105bis, Xi'an, China, Apr. 8-12, 2019, 6 pages.

Qualcomm Incorporated, "User Plane changes to minimize the mobility interruption during Make-Before-Break (MBB) HO," R2-1903645, Revision of R2-1900360, Presented at 3GPP TSG-RAN WG2 Meeting #105bis, Xi'an, China, Apr. 8-Apr. 12, 2019, 5 pages.

* cited by examiner

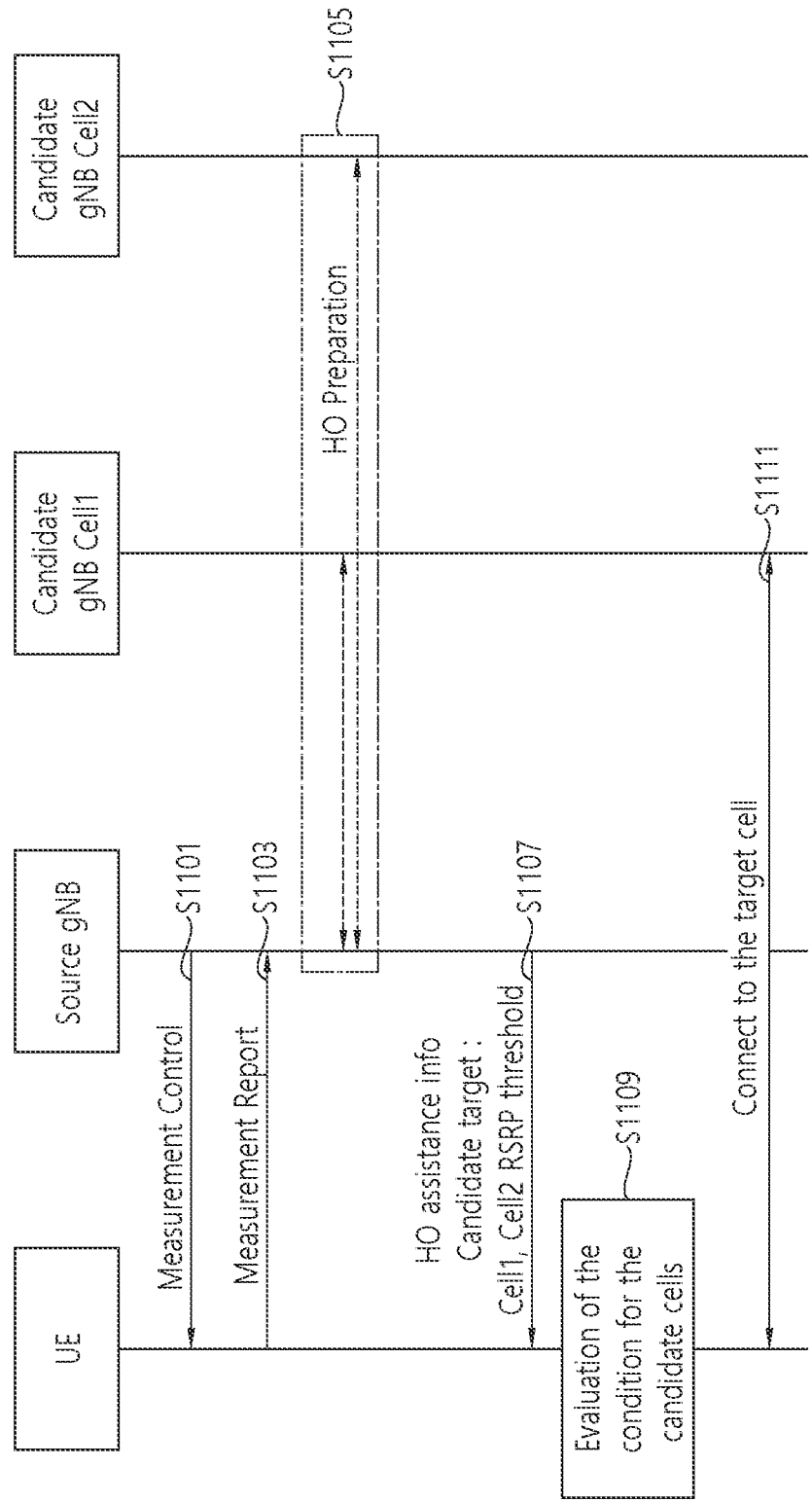

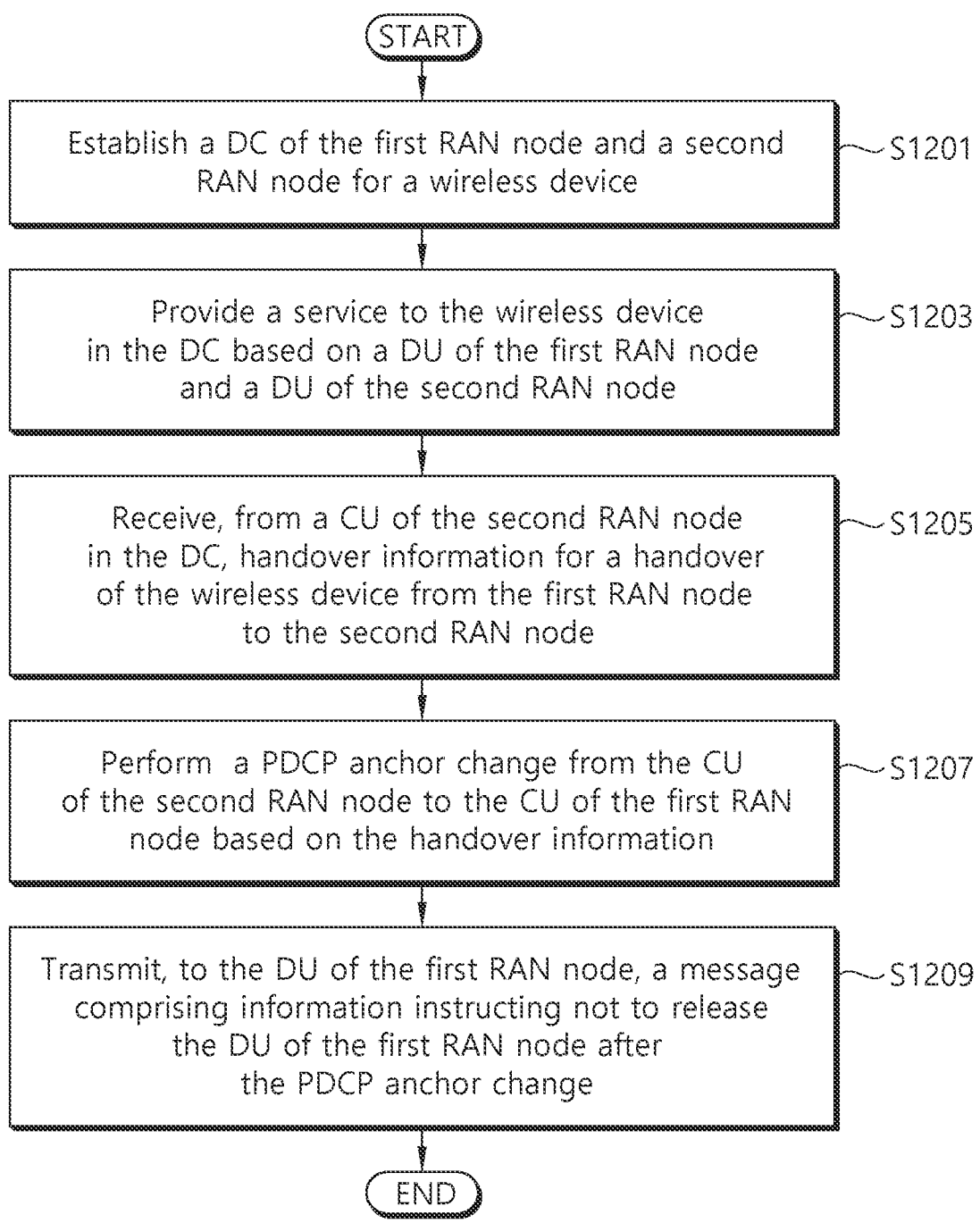

METHOD AND APPARATUS FOR MOBILITY MANAGEMENT IN WIRELESS COMMUNICATION SYSTEM

CROSS-REFERENCE TO RELATED APPLICATIONS

This application is a National Stage application under 35 U.S.C. § 371 of International Application No. PCT/KR2020/005897, filed on May 4, 2020, which claims the benefit of Korean Patent Application No. 10-2019-0052191, filed on May 3, 2019. The disclosures of the prior applications are incorporated by reference in their entirety.

BACKGROUND OF THE DISCLOSURE

Field of the Disclosure

The present disclosure relates to a mobility management in a wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In a wireless communication system, a wireless device and/or user equipment (UE) may move along cells/base stations deployed in a wide range of areas. To provide proper services to the wireless device, the network should manage a mobility of the wireless device. For example, the network may control a handover of the wireless device from a source cell to a target cell.

SUMMARY OF THE DISCLOSURE

Technical Problem

An aspect of the present disclosure is to provide method and apparatus for a mobility management in a wireless communication system.

Another aspect of the present disclosure is to provide method and apparatus for a handover in a wireless communication system.

Another aspect of the present disclosure is to provide method and apparatus for an enhanced handover in a wireless communication system.

Another aspect of the present disclosure is to provide method and apparatus for an enhanced handover in a central unit (CU)-distributed unit (DU) split architecture in a wireless communication system.

Technical Solution

According to various embodiments, a method performed by a central unit (CU) in a first radio access network (RAN) node in a wireless communication system comprises: establishing a dual connectivity (DC) of the first RAN node and a second RAN node for a wireless device; providing a service to the wireless device in the DC based on a distributed unit (DU) of the first RAN node and a DU of the second RAN node; receiving, from a CU of the second RAN node in the DC, handover information for a handover of the wireless device from the second RAN node to the first RAN node; performing a packet data convergence protocol (PDCP) anchor change from the CU of the second RAN node to the CU of the first RAN node based on the handover information; and transmitting, to the DU of the first RAN node, a message comprising information instructing not to release the DU of the first RAN node after the PDCP anchor change.

Advantageous Effect

The present disclosure can have various advantageous effects.

For example, various embodiments of the present disclosure may provide solutions to make UE's experience better by reducing an interruption time during mobility in a way of, for example, supporting simultaneous connectivity with source cell and target cell. Therefore, better UE experience on handover can be realized in a wireless communication system (e.g., NR). The solutions to reduce an interruption time in a handover and/or a secondary cell group (SCG) change may be also beneficial to high mobility situations such as high speed trains and/or aerial use case where channel situations becomes challenging in terms of handover performance.

Various embodiments of the present disclosure can be applied to both inter-/intra frequency handover and/or SCG change. Further, various embodiments of the present disclosure may not be limited to a high frequency range.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 11 shows an example of a conditional handover procedure to which technical features of the present disclosure can be applied.

FIG. 12 shows an example of a method for performing an enhanced handover according to an embodiment of the present disclosure.

DESCRIPTION OF EXEMPLARY EMBODIMENTS

Figure 1:
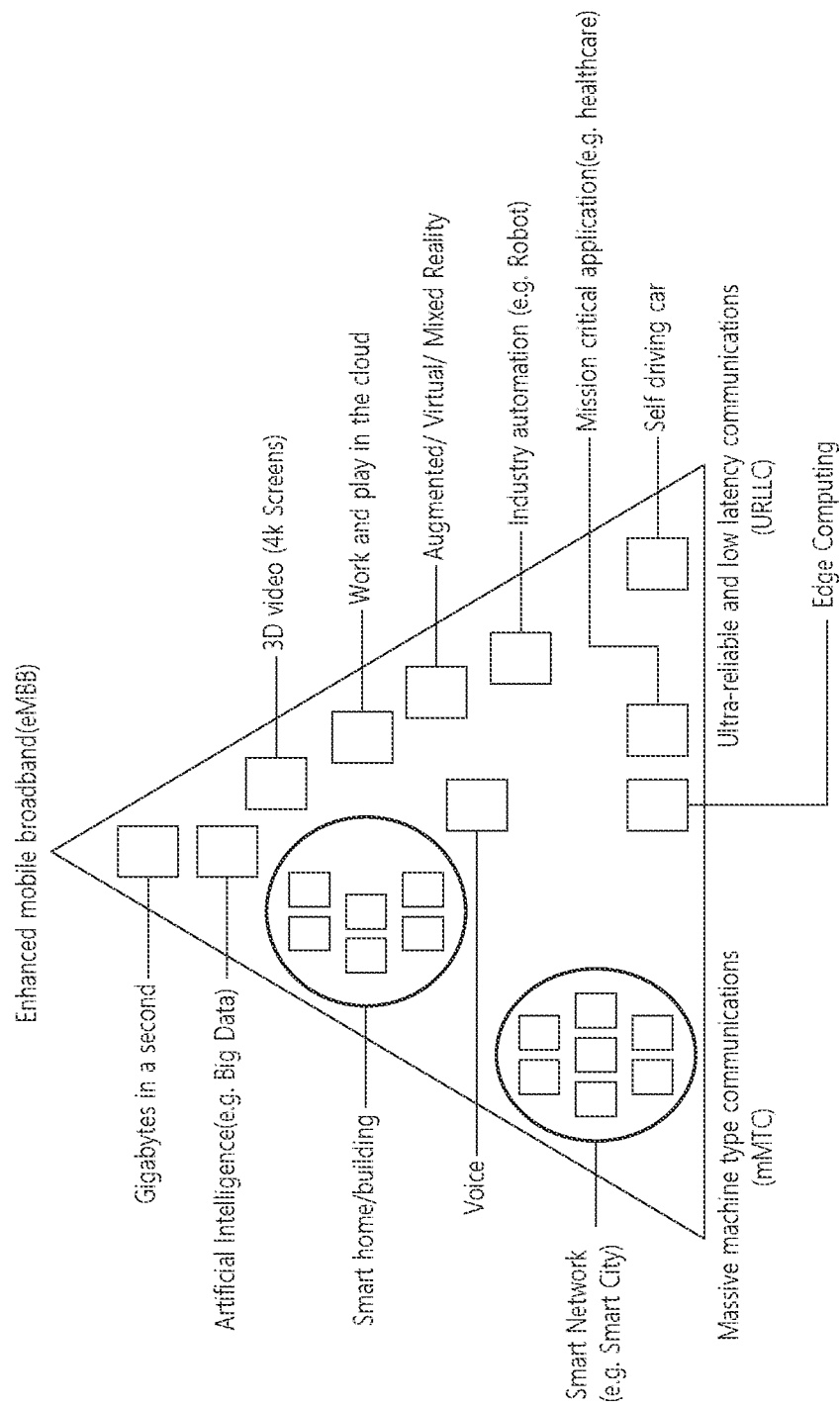
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as follows:

'Enhanced handover' refers to a handover procedure comprising, for a wireless device currently communicating with a single RAN node (i.e., MN), establishing a DC of the MN and a SN for the wireless device, and then performing a handover of the wireless device from the MN to the SN.

'radio access network (RAN) node' refers to a network entity to which a wireless device can access through a radio channel. Examples of the RAN node may comprise gNB, eNB, base station, and/or cell.

Network controlled handover: UE may receive a handover command comprising a single target cell from a network and perform a handover (or, handover attempt) to the target cell indicated by the network. This handover may be referred to as 'network controlled handover', and the handover command related to the network controlled handover may be referred to as 'network controlled handover command'.

Conditional handover: UE may receive a handover command comprising a list of candidate target cells (or simply referred to as candidate cells) and handover condition(s), and autonomously perform a handover (or, handover attempt) to a target cell among the candidate cells for which a handover condition is satisfied. This handover may be referred to as 'conditional handover', and the handover command related to the conditional handover may be referred to as 'conditional handover command'. For the conditional handover, the UE may autonomously select the target cell among the candidate cells based on measurements on the candidate cells.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
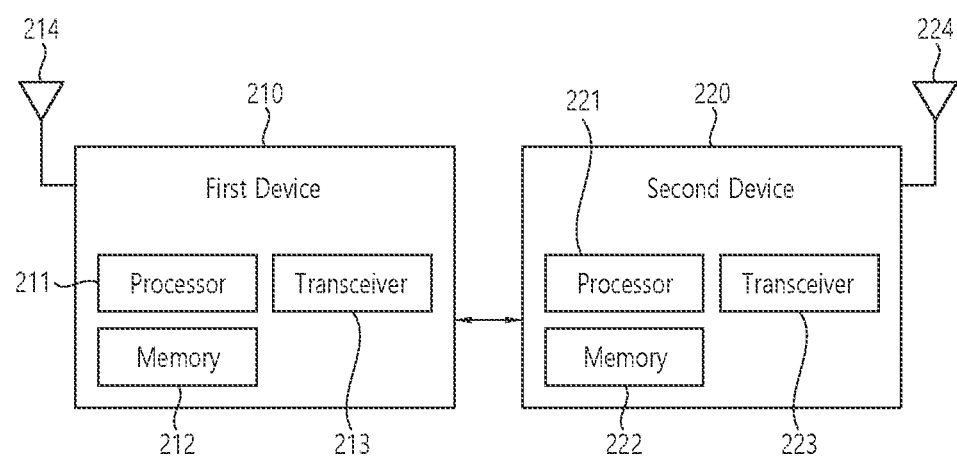
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

According to various embodiments, some components of the first device 210 and/or the second device 220 may be omitted, and the first device 210 and/or the second device 220 may further comprise one or more other components not illustrated in FIG. 2. For example, the first device 210 (or the second device 220) may further comprise a communication interface which is connected to the processor 211 (or processor 221) and may be controlled to transmit and receive signals through wired backhaul or wireless backhaul.

According to various embodiments, the processor 211 (or the processor 221) may be configured to, or configured to control the transceiver (e.g., transceiver 213 and/or transceiver 223) and/or the communication interface to implement steps performed by the RAN node (or, gNB, eNB, base station, cell, CU, DU, CU-CP, CU-UP) as illustrated throughout the disclosure.

Figure 3:
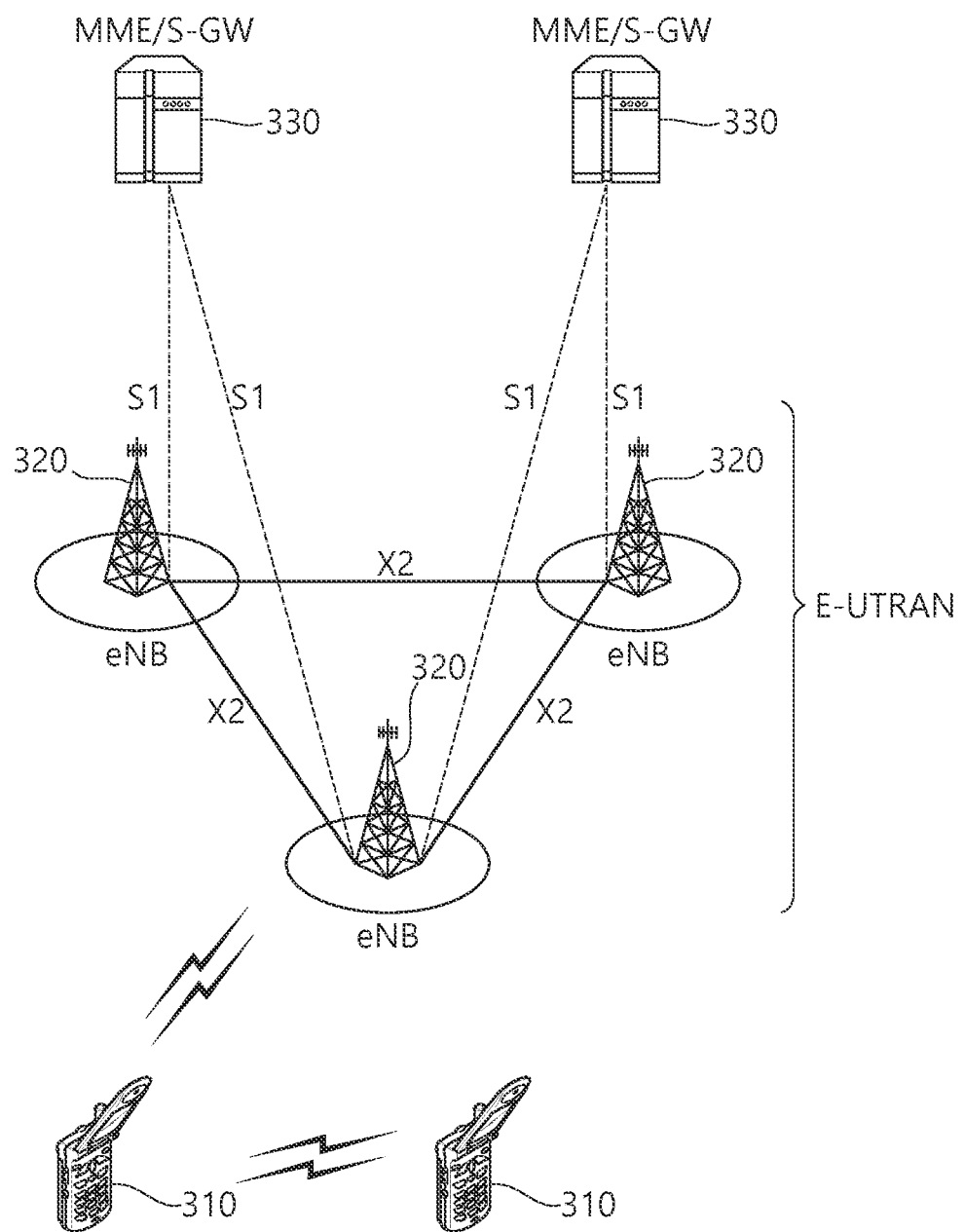
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
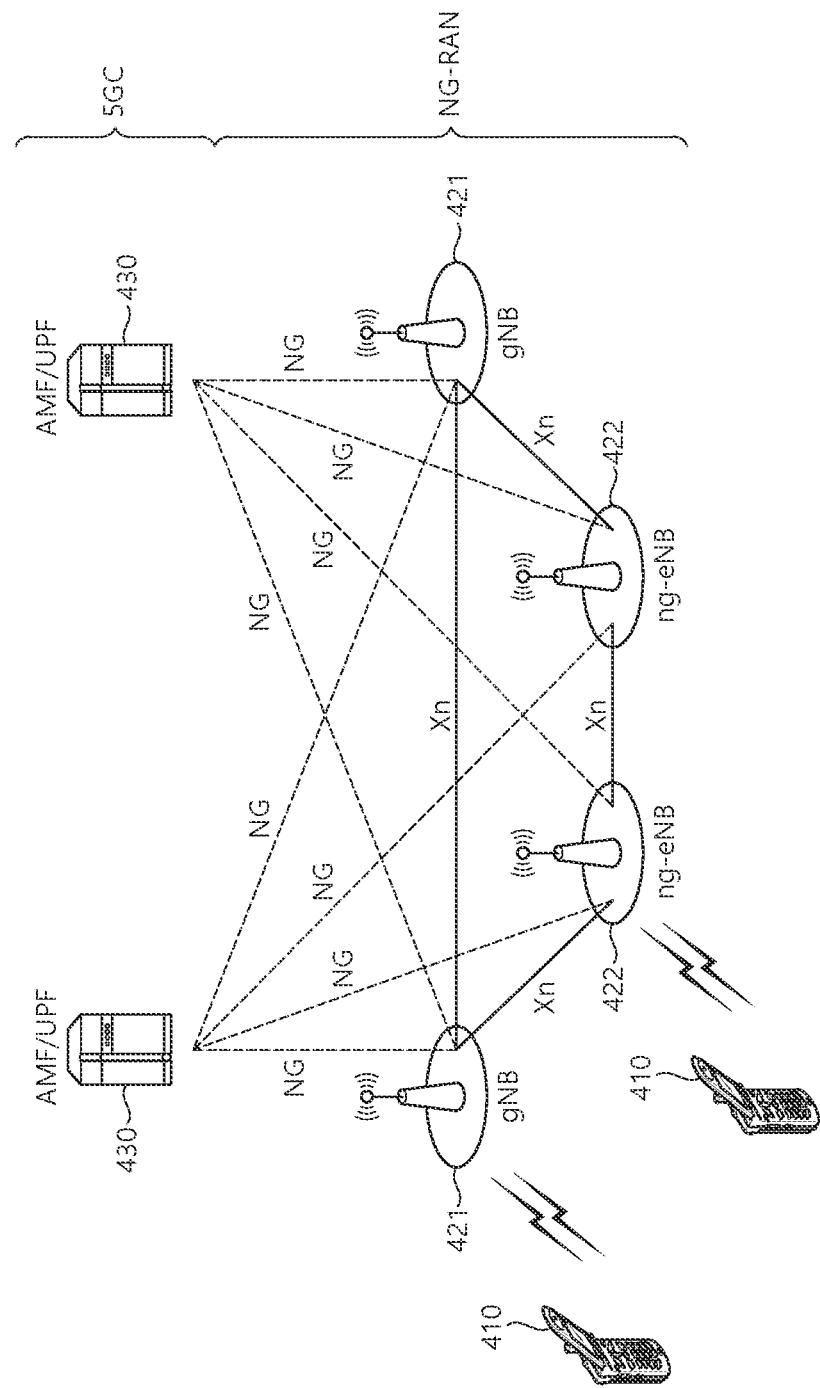
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NW") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
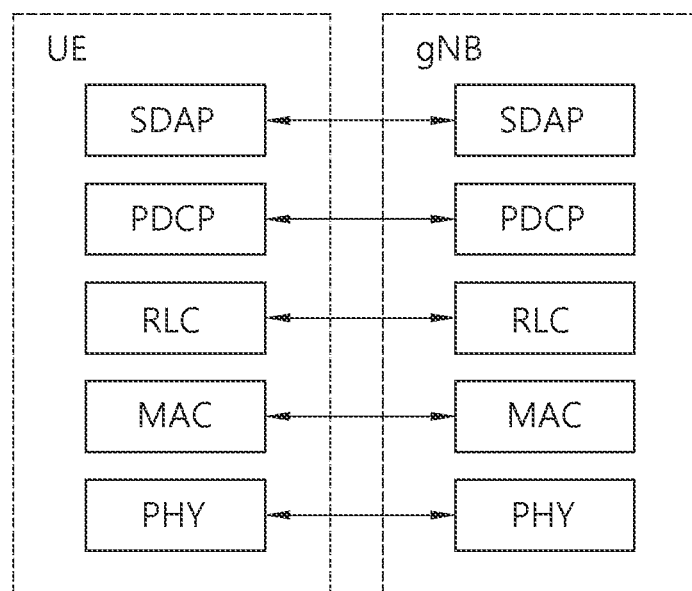
FIG. 5 shows a block diagram of a user plane protocol stack to which the technical features of the present disclosure can be applied.
Figure 6:
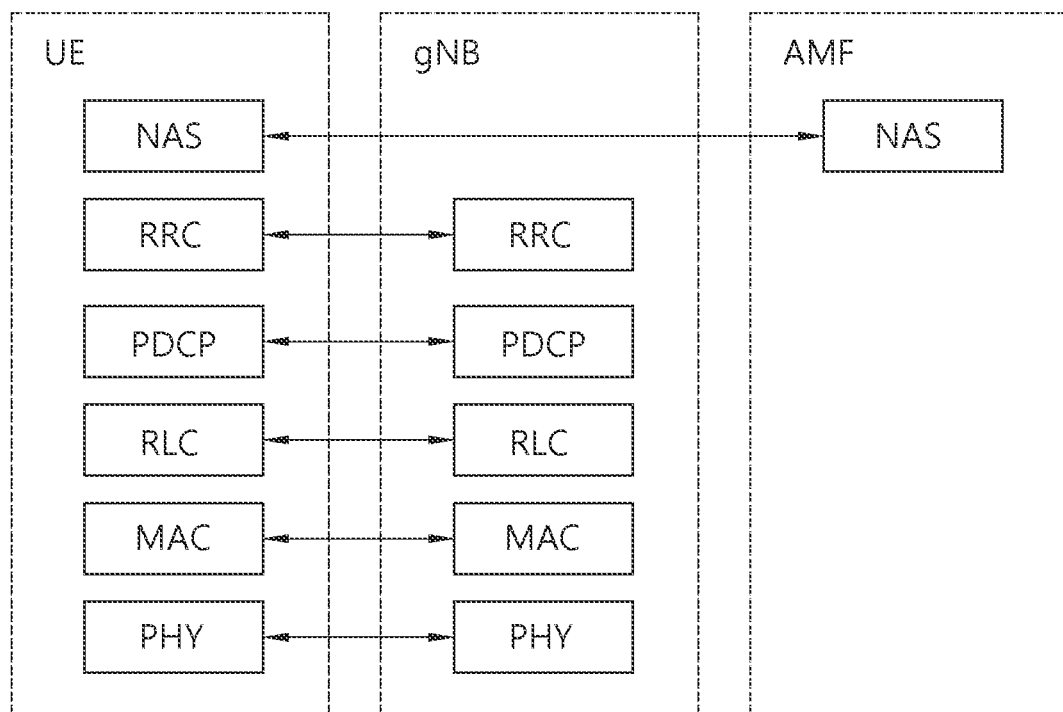
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5 GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
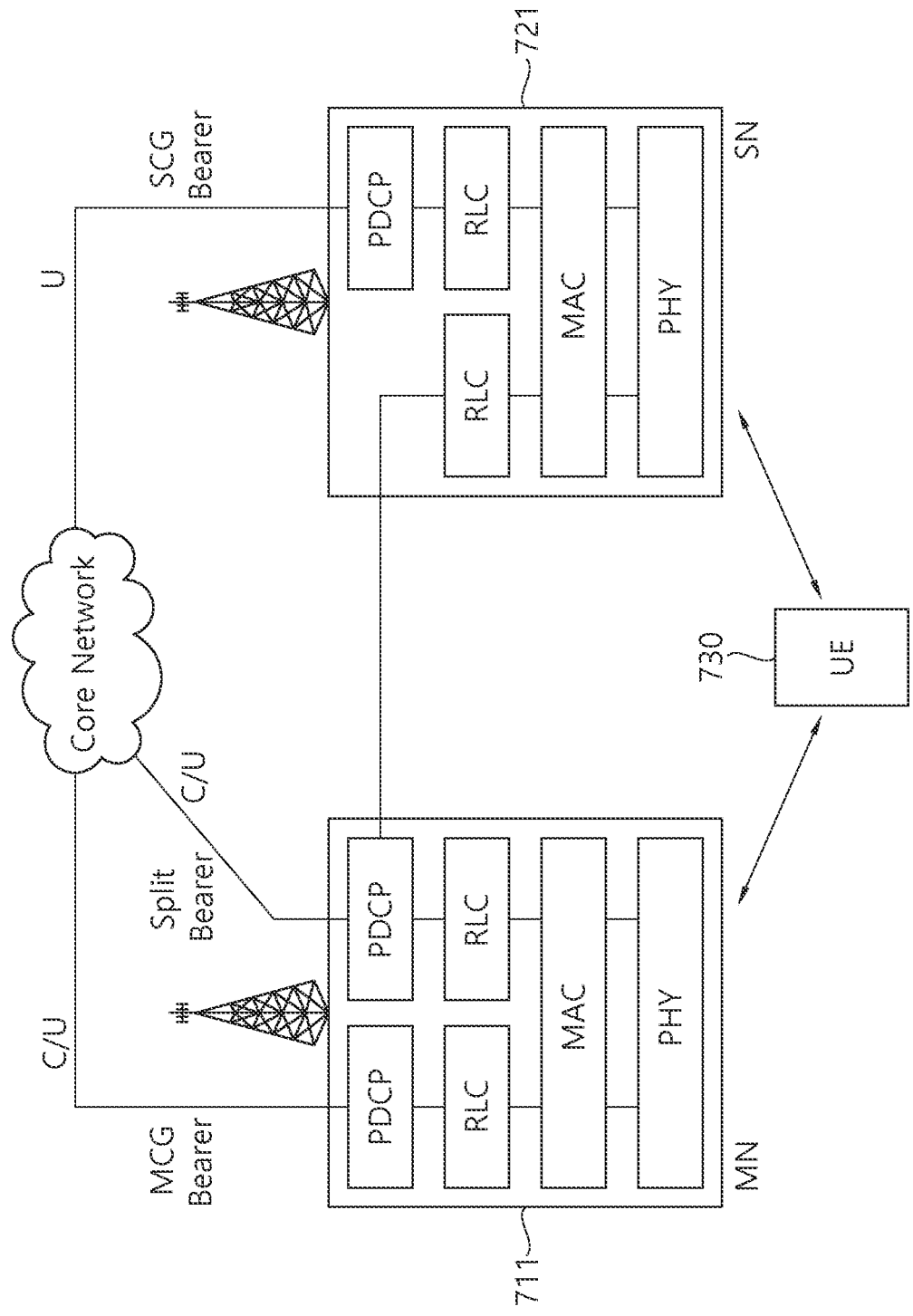
FIG. 7 shows an example of a dual connectivity (DC) architecture to which technical features of the present disclosure can be applied.

FIG. 7 shows an example of a dual connectivity (DC) architecture to which technical features of the present disclosure can be applied.

Referring to FIG. 7, MN 711, SN 721, and a UE 730 communicating with both the MN 711 and the SN 721 are illustrated. As illustrated in FIG. 7, DC refers to a scheme in which a UE (e.g., UE 730) utilizes radio resources provided by at least two RAN nodes comprising a MN (e.g., MN 711) and one or more SNs (e.g., SN 721). In other words, DC refers to a scheme in which a UE is connected to both the MN and the one or more SNs, and communicates with both the MN and the one or more SNs. Since the MN and the SN may be in different sites, a backhaul between the MN and the SN may be construed as non-ideal backhaul (e.g., relatively large delay between nodes).

MN (e.g., MN 711) refers to a main RAN node providing services to a UE in DC situation. SN (e.g., SN 721) refers to an additional RAN node providing services to the UE with the MN in the DC situation. If one RAN node provides services to a UE, the RAN node may be a MN. SN can exist if MN exists.

For example, the MN may be associated with macro cell whose coverage is relatively larger than that of a small cell.

However, the MN does not have to be associated with macro cell—that is, the MN may be associated with a small cell. Throughout the disclosure, a RAN node that is associated with a macro cell may be referred to as 'macro cell node'. MN may comprise macro cell node.

For example, the SN may be associated with small cell (e.g., micro cell, pico cell, femto cell) whose coverage is relatively smaller than that of a macro cell. However, the SN does not have to be associated with small cell—that is, the SN may be associated with a macro cell. Throughout the disclosure, a RAN node that is associated with a small cell may be referred to as 'small cell node'. SN may comprise small cell node.

The MN may be associated with a master cell group (MCG). MCG may refer to a group of serving cells associated with the MN, and may comprise a primary cell (PCell) and optionally one or more secondary cells (SCells). User plane data and/or control plane data may be transported from a core network to the MN through a MCG bearer. MCG bearer refers to a bearer whose radio protocols are located in the MN to use MN resources. As shown in FIG. 7, the radio protocols of the MCG bearer may comprise PDCP, RLC, MAC and/or PHY.

The SN may be associated with a secondary cell group. SCG may refer to a group of serving cells associated with the SN, and may comprise a PCell and optionally one or more SCells. User plane data may be transported from a core network to the SN through a SCG bearer. SCG bearer refers to a bearer whose radio protocols are located in the SN to use SN resources. As shown in FIG. 7, the radio protocols of the SCG bearer may comprise PDCP, RLC, MAC and PHY.

User plane data and/or control plane data may be transported from a core network to the MN and split up/duplicated in the MN, and at least part of the split/duplicated data may be forwarded to the SN through a split bearer. Split bearer refers to a bearer whose radio protocols are located in both the MN and the SN to use both MN resources and SN resources. As shown in FIG. 7, the radio protocols of the split bearer located in the MN may comprise PDCP, RLC, MACN and PHY. The radio protocols of the split bearer located in the SN may comprise RLC, MAY and PHY.

According to various embodiments, PDCP anchor/PDCP anchor point/PDCP anchor node refers to a RAN node comprising a PDCP entity which splits up and/or duplicates data and forwards at least part of the split/duplicated data over X2/Xn interface to another RAN node. In the example of FIG. 7, PDCP anchor node may be MN.

According to various embodiments, the MN for the UE may be changed. This may be referred to as handover, or a MN handover.

According to various embodiments, a SN may newly start providing radio resources to the UE, establishing a connection with the UE, and/or communicating with the UE (i.e., SN for the UE may be newly added). This may be referred to as a SN addition.

According to various embodiments, a SN for the UE may be changed while the MN for the UE is maintained. This may be referred to as a SN change.

According to various embodiments, DC may comprise E-UTRAN NR-DC (EN-DC), and/or multi-radio access technology (RAT)-DC (MR-DC). EN-DC refers to a DC situation in which a UE utilizes radio resources provided by E-UTRAN node and NR RAN node. MR-DC refers to a DC situation in which a UE utilizes radio resources provided by RAN nodes with different RATs.

Figure 8:
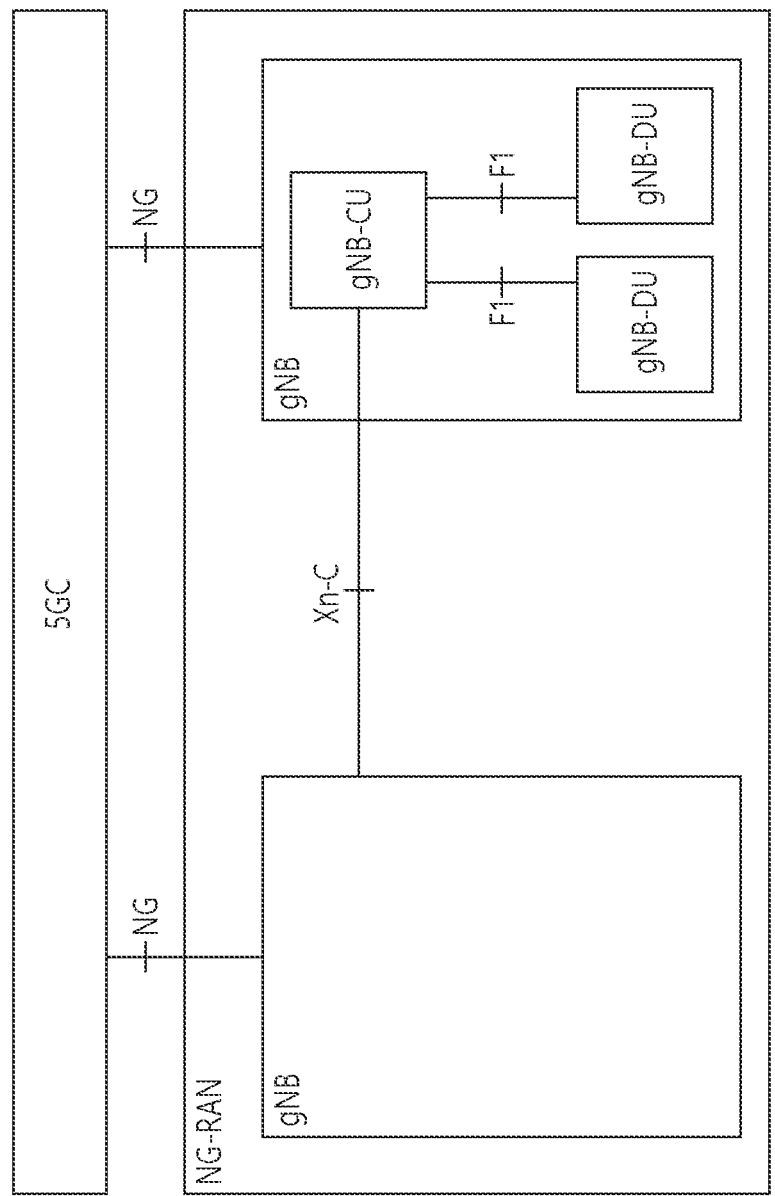
FIG. 8 shows an example of the overall architecture of an NG-RAN to which technical features of the present disclosure can be applied.

FIG. 8 shows an example of the overall architecture of an NG-RAN to which technical features of the present disclosure can be applied.

Referring to FIG. 8, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU.

The mapping between QoS flows and radio bearers is performed by gNB-CU and the granularity of bearer related management over F1 is radio bearer level. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

Figure 9:
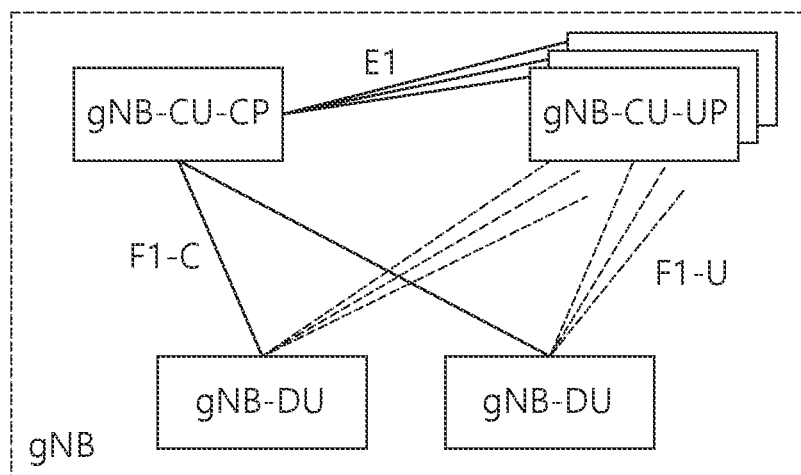
FIG. 9 shows an example of overall architecture for separation of gNB-CU-control plane (gNB-CU-CP) and gNB-CU-user plane (gNB-CU-UP) to which technical features of the present disclosure can be applied.

FIG. 9 shows an example of overall architecture for separation of gNB-CU-control plane (gNB-CU-CP) and gNB-CU-user plane (gNB-CU-UP) to which technical features of the present disclosure can be applied.

Referring to FIG. 9, a gNB may include a gNB-CU-CP, multiple gNB-CU-UPs and multiple gNB-DUs. A gNB-CU-CP may be simply referred to as CU-CP and a gNB-CU-UP may be simply referred to as CU-UP. The gNB-CU-CP and the gNB-CU-UP may be included in gNB-CU.

The gNB-CU-CP may be a logical node hosting an RRC and a control plane part of a PDCP protocol of the gNB-CU for a gNB. As illustrated, the gNB-CU-CP is connected to the gNB-DU through F1-C interface. The gNB-CU-CP terminates an E1 interface connected with the gNB-CU-UP and the F1-C interface connected with the gNB-DU.

The gNB-CU-UP may be a logical node hosting a user plane part of the PDCP protocol of the gNB-CU for a gNB, and the user plane part of the PDCP protocol and a SDAP protocol of the gNB-CU for a gNB. As illustrated, the gNB-CU-UP is connected to the gNB-DU through F1-U interface, and is connected to the gNB-CU-CP through the E1 interface. The gNB-CU-UP terminates the E1 interface connected with the gNB-Cu-CP and the F1-U interface connected with the gNB-DU.

According to an illustration shown in FIG. 9, the following properties may hold:

(1) A gNB-DU may be connected to a gNB-CU-CP.
(2) A gNB-CU-UP may be connected to a gNB-CU-CP.
(3) A gNB-DU can be connected to multiple gNB-CU-UPs under the control of the same gNB-CU-CP (i.e., the gNB-CU-CP to which the gNB-DU is connected and the multiple gNB-CU-UPs are connected).
(4) A gNB-CU-UP can be connected to multiple DUs under the control of the same gNB-CU-CP (i.e., the gNB-CU-CP to which the gNB-CU-UP is connected and the multiple DUs are connected).

Figure 10A:
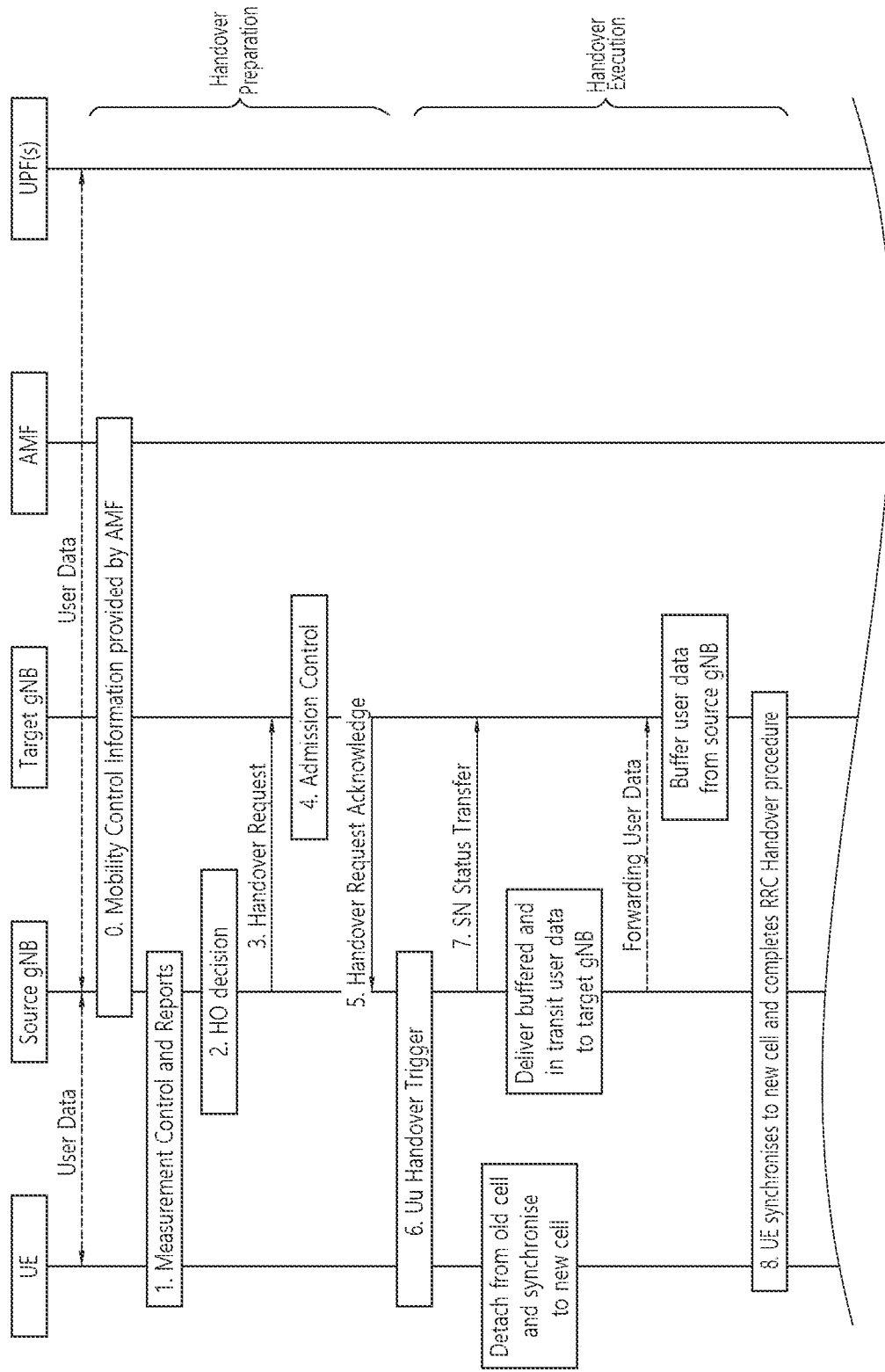
FIGS. 10A-10B show an example of network controlled handover procedure to which technical features of the present disclosure can be applied.
Figure 10B:
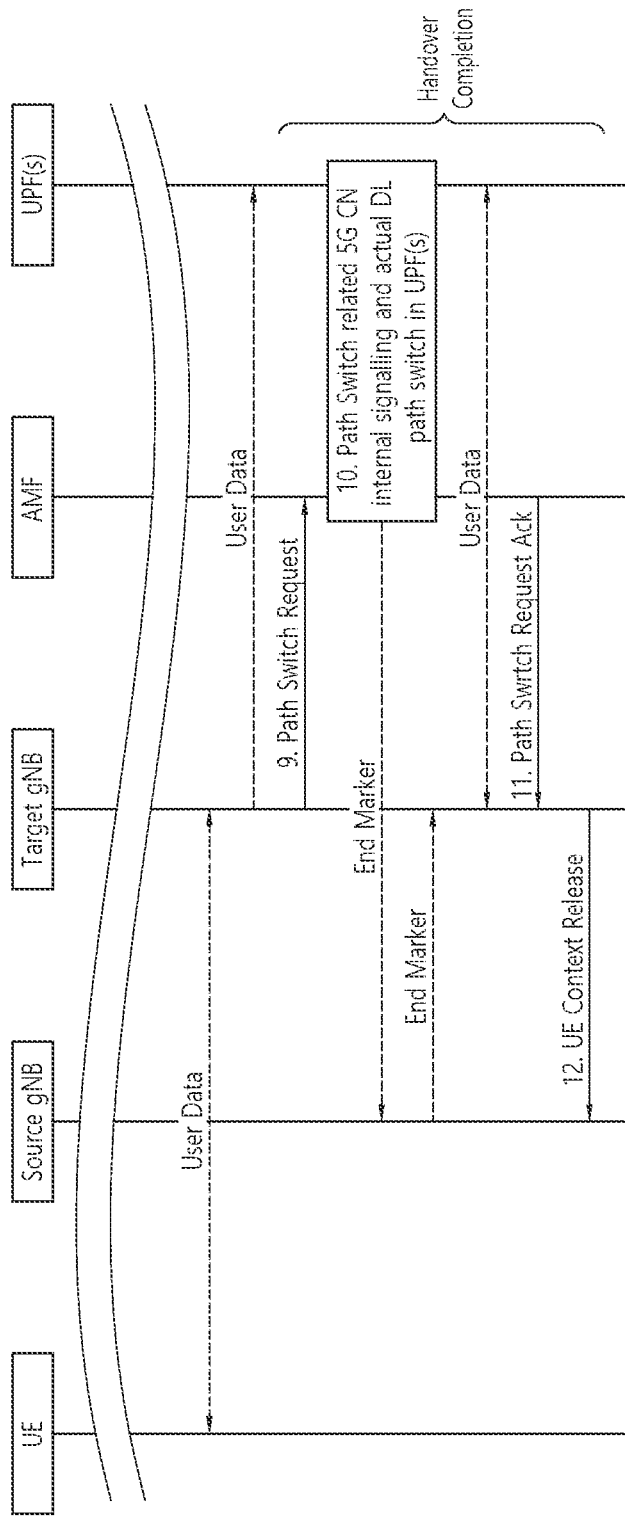

FIGS. 10A-10B show an example of network controlled handover procedure to which technical features of the present disclosure can be applied. Throughout the disclosure, the gNB can be substituted for eNB, cell, RAN node or base station, and both the access and mobility management function (AMF) and user plane function(s) (UPF(s)) can be substituted for a mobility management entity (MME)—that is, steps associated with the AMF and/or the UPF can be associated with the MME.

Referring to FIG. 10A, in step 0, the UE context within the source gNB may contain information regarding roaming and access restrictions which were provided either at connection establishment or at the last tracking area (TA) update.

In step 1, the source gNB may configure the UE measurement procedures and the UE reports according to the measurement configuration.

In step 2, the source gNB may decide to handover the UE, based on MeasurementReport and RRM information.

In step 3, the source gNB may issue a Handover Request message to the target gNB passing a transparent RRC container with necessary information to prepare the handover at the target side. The information may include at least the target cell ID, KgNB*, the C-RNTI of the UE in the source gNB, RRM-configuration including UE inactive time, basic AS-configuration including antenna Info and DL Carrier Frequency, the current QoS flow to DRB mapping rules applied to the UE, the SIB1 from source gNB, the UE capabilities for different RATs, PDU session related information, and can include the UE reported measurement information including beam-related information if available. The PDU session related information may include the slice information and QoS flow level QoS profile(s). After issuing a Handover Request, the source gNB may not reconfigure the UE, including performing Reflective QoS flow to DRB mapping.

In step 4, admission control may be performed by the target gNB. Slice-aware admission control shall be performed if the slice information is sent to the target gNB. If the PDU sessions are associated with non-supported slices the target gNB shall reject such PDU Sessions.

In step 5, the target gNB may prepare the handover with L1/L2 and send the HANDOVER REQUEST ACKNOWLEDGE to the source gNB, which may include a transparent container to be sent to the UE as an RRC message to perform the handover.

In step 6, the source gNB may trigger the Uu handover by sending an RRCReconfiguration message to the UE, containing the information required to access the target cell: at least the target cell ID, the new C-RNTI, the target gNB security algorithm identifiers for the selected security algorithms. It can also include a set of dedicated RACH resources, the association between RACH resources and SSB(s), the association between RACH resources and UE-specific CSI-RS configuration(s), common RACH resources, and system information of the target cell.

In step 7, the source gNB may send the SN STATUS TRANSFER message to the target gNB.

In step 8, the UE may synchronize to the target cell and complete the RRC handover procedure by sending RRCReconfigurationComplete message to target gNB.

FIG. 10B illustrates steps which continue from the steps illustrated in FIG. 10A.

Referring to FIG. 10B, in step 9, the target gNB may send a PATH SWITCH REQUEST message to AMF to trigger 5 GC to switch the DL data path towards the target gNB and to establish an NG-C interface instance towards the target gNB.

In step 10, core network entity(ies)(e.g., AMF, UPF(s) and/or MME) may switch the DL data path towards the target gNB. The UPF may send one or more "end marker" packets on the old path to the source gNB per PDU session/tunnel and then can release any U-plane/TNL resources towards the source gNB.

In step 11, the AMF may confirm the PATH SWITCH REQUEST message with the PATH SWITCH REQUEST ACKNOWLEDGE message.

In step 12, upon reception of the PATH SWITCH REQUEST ACKNOWLEDGE message from the AMF, the target gNB may send the UE CONTEXT RELEASE to inform the source gNB about the success of the handover. The source gNB can then release radio and C-plane related resources associated to the UE context. Any ongoing data forwarding may continue.

FIG. 11 shows an example of a conditional handover procedure to which technical features of the present disclosure can be applied. FIG. 11 shows an overall procedure of condition based autonomous handover procedure (i.e., conditional handover procedure).

Referring to FIG. 11, in step S1101, the source gNB may transmit measurement control message to the UE. The source gNB may configure the UE measurement procedures according to the roaming and access restriction information and, for example, the available multiple frequency band information through the measurement control message. Measurement control information provided by the source gNB through the measurement control message may assist the function controlling the UE's connection mobility.

In step S1103, the UE may transmit a measurement report message to the source gNB. The measurement report message may comprise a result of measurement on neighbor cell(s) around the UE which can be detected by the UE. The UE may generate the measurement report message according to a measurement configuration and/or measurement control information in the measurement control message received in step S1101.

In step S1105, the source gNB may perform handover preparation with the candidate gNB cell 1 and the candidate gNB cell 2. The source gNB might determine the set of candidate cells (i.e., the candidate gNB cell 1 and the candidate gNB cell 2) based on the measurement report received from the UE.

In step S1107, the source gNB may provide handover assistance information which includes set of candidate cells (e.g., the candidate gNB cell 1 and the candidate gNB cell 2) and handover conditions (e.g., RSRP thresholds) for a conditional handover. The handover condition can be configured for each candidate cell, or for the set of candidate cells. According to various embodiments, it would be possible for the network to prepare the candidate cells and provide the handover assistance information without the measurement report from the UE if the network is able to know the trajectory or location of the UE based on e.g. location reporting. The handover assistance information would comprise cell quality based conditions and a configuration which would be used in a target cell. Also, the handover assistance information would include configuration for one or more candidate cells. The handover assistance information may be referred to as conditional handover command.

In step S1109, the UE may perform an evaluation of the handover conditions for the candidate cells. If the UE receives handover assistance information, the UE would initiate to evaluate the handover conditions for the candidate cells in the list to determine whether to perform conditional handover to one of the candidate cells.

In step S1111, the UE may connect to the targetdisconnect from the source gNB, and connect to the target cell (i.e., candidate gNB cell 1), if the handover condition for the candidate gNB cell 1 is met. The candidate gNB cell 1 may become a target cell for a conditional handover, and the UE would perform connecting to the prepared target cell.

According to various embodiments, the handover assistance information (or, the conditional handover command) may comprise handover validity timer. For example, if the handover validity timer expires, the network and/or the UE may discard a configuration associated with the conditional handover. In addition, based on a measurement report from the UE, the network would configuration, modify and/or discard the configuration associated with the conditional handover.

According to various embodiments, if the UE successfully connects to the target cell, the target cell could inform to the source cell to discard the reserved configuration of candidate cells other than the target cell.

In a wireless communication system such as NR, almost or exact 0ms interruption may be one of the requirements to provide seamless handover for UE experience. Mobility performance may be one of the most important performance metrics. Therefore, it is important to identify handover solution to achieve high handover performance with almost or exact 0ms interruption, low latency and/or high reliability. For example, almost or exact 0ms interruption time can be achievable by using intra-cell beam mobility and/or by an addition/release of SCell for CA operation. However, there might be a demand to achieve almost or exact 0ms interruption time in more scenarios especially in URLLC type of service which may require 1ms of end-to-end delay in some scenarios.

In order to perform simultaneous connectivity to source cell and target cell, problems may happen if no enhancement.

Fundamentally, MR-DC is a feature to boost the capacity by dual connection for a UE, in which it is assumed that the secondary gNB has no direct control plane connection to a core network. However, for mobility enhancement, the secondary node has to serve the UE as a master node later. Thus, from source point of view, it should be certain that the secondary node has independent control plane connection (e.g., next generation control plane (NG-C) connection) to a core network before the handover is triggered.

On the other hand, how to perform the procedures from high level point of view, is also an issue. That is, how to add a target RAN node for a handover as a secondary node (or, secondary gNB (SgNB)) for a DC, handover to the target RAN node while keeping the source RAN node as secondary node (e.g., SgNB), may be an issue.

If CU/DU split and/or CU-CP/CU-UP split is considered, how to realize the goal, i.e., not changing the L2 in DU side so that interruption time on mobility can be reduced as much as possible, may also be an issue. However, it is not easy to realize the goal if no enhancement is done, according to the followings:

when the security key is changed for a bearer, the associated PDCP and RLC entities are re-established, while MAC behaviour might depend on the solution selected by the network, e.g. MAC reset, change of LCID;

for MCG bearer, split bearer and SCG bearer, during handover, MCG/SCG PDCP and RLC are re-established and MCG/SCG MAC is reset; and/or if a bearer type change happens through handover procedure, then for MCG bearer, split bearer and SCG bearer, MCG/SCG PDCP/RLC are re-established and MCG/SCG MAC is reset.

Therefore, reducing HO/SCG change interruption time and improving HO reliability should be the use cases and requirements in a wireless communication system such as NR. The mobility enhancements should be applied to both inter-/intra-frequency HO/SCG change. The mobility enhancements should not be limited to the high frequency range although challenges/channel characteristic in high/med frequency should be considered.

FIG. 12 shows an example of a method for performing an enhanced handover according to an embodiment of the present disclosure. The method may be performed by a CU in a first RAN node.

Referring to FIG. 12, in step S1201, the CU may establish a DC of the first RAN node and a second RAN node for a wireless device (e.g., UE). For example, to establish the DC of the first RAN node and the second RAN node, the first RAN node may receive, from a CU of the second RAN node, SN addition request message. After the DC is established, the first RAN node may be a SN for the DC and the second RAN node may be a MN for the DC.

In step S1203, the CU may provide a service to the wireless device in the DC based on a DU of the first RAN node and a DU of the second RAN node. For example, the wireless device may utilize radio resources provided by both the first RAN node and the second RAN node.

In step S1205, the CU may receive, from a CU of the second RAN node in the DC, handover information for a handover of the wireless device from the second RAN node to the first RAN node. That is, the first RAN node may be a target RAN node for an enhanced handover. For the first RAN node as a SN in the DC to become a target RAN node, it can be needed that the SN (i.e., the first RAN node) support a control plane connection (e.g., NG-C connection, S1-control plane connection) to a core network. The handover information may comprise information informing that an enhanced handover is to be performed from the second RAN node to the first RAN node. The handover information may also be referred to as, or substituted for, a handover request, or a handover indication.

In step S1207, the CU may perform a PDCP anchor change from the CU of the second RAN node to the CU of the first RAN node based on the handover information. For example, the first RAN node may provide a service to the wireless device as a SN in the DC with the second RAN node (i.e., MN). Since the second RAN node is a MN in the DC, the second RAN node may be a PDCP anchor during the DC. In this case, when the CU of the first RAN node receives handover information from the CU of the second RAN node during the DC, handover procedure may be initiated, and a PDCP anchor may be changed from the CU of the second RAN node to the CU of the first RAN node.

In step S1209, the CU may transmit, to the DU of the first RAN node, a message comprising information instructing not to release the DU of the first RAN node after the PDCP anchor change. Even though the PDCP anchor may be changed to the first RAN node due to handover, RLC/MAC/PHY resources of the first RAN node does not need to be released/reset or re-established, since the first RAN node has already served the wireless device as a SN in the DC. Therefore, the CU of the first RAN node may transmit the message to the DU of the first RAN node so that resources of the DU of the first RAN node or the DU of the first RAN node may not be released/reset or re-established, and may be maintained/kept after the handover and/or the PDCP anchor change.

According to various embodiments, the SN addition request message may comprise handover information for informing that an enhanced handover is to be performed from the second RAN node to the first RAN node.

According to various embodiments, the SN addition request message may comprise a request for reporting whether a control plane connection to a core network is supported by the first RAN node.

According to various embodiments, the CU of the first RAN node may receive, from the second RAN node, a request message for setting up an interface (e.g., X2/Xn interface) between the first RAN node and the second RAN node. In response, the CU of the first RAN node may transmit, to the second RAN node, a response message for the request message. The request message may be a X2/Xn setup request message, and the response message may be a X2/Xn setup response message. The transmission/reception direction of the request message and the response message may be changed.

According to various embodiments, the request message may comprise information informing whether a control plane connection to a core network is supported by the second RAN node. The response message may comprise information informing whether a control plane connection to the core network is supported by the first RAN node.

According to various embodiments, the request message may comprise a request for reporting whether a control plane connection to a core network is supported by the first RAN node. The response message may comprise information informing whether a control plane connection to the core network is supported by the first RAN node.

According to various embodiments, the DC may be established based on a determination to perform an enhanced handover to the first RAN node. The enhanced handover may be determined based on information informing that a control plane connection to a core network is supported by the first RAN node. For example, the second RAN node may receive a message comprising information informing whether a control plane connection to a core network is supported by the first RAN node, from the first RAN node. The second RAN node may determine to perform an enhanced handover to the first RAN node based on that the control plane connection to a core network is supported by the first RAN node.

According to various embodiments, the information instructing not to release the DU of the first RAN node after the PDCP anchor change may be configured to instruct to maintain resources of the DU of the first RAN node after the PDCP anchor change. The resources may comprise at least one of PHY resources, MAC layer resources, or RLC layer resources.

According to various embodiments, the CU of the first RAN node may comprise CU-CP. The CU-CP may transmit, to a CU-UP of the first RAN node, handover information for informing that an enhanced handover is to be performed from the second RAN node to the first RAN node.

According to various embodiments, the CU of the first RAN node may transmit, to the second RAN node, a message for requesting a release of resources allocated by the second RAN node. Even after the PDCP anchor change, the DC of the first RAN node and the second RAN node may be maintained. To complete a procedure of handover from the second RAN node to the first RAN node after the PDCP anchor change, the CU of the first RAN node may transmit, to the second RAN node, a message for requesting a release of resources allocated by the second RAN node. After that, the DC of the first RAN node and the second RAN node is terminated as the resources allocated by the second RAN node is released, and the first RAN node may provide a service to the wireless device alone.

Figure 13:
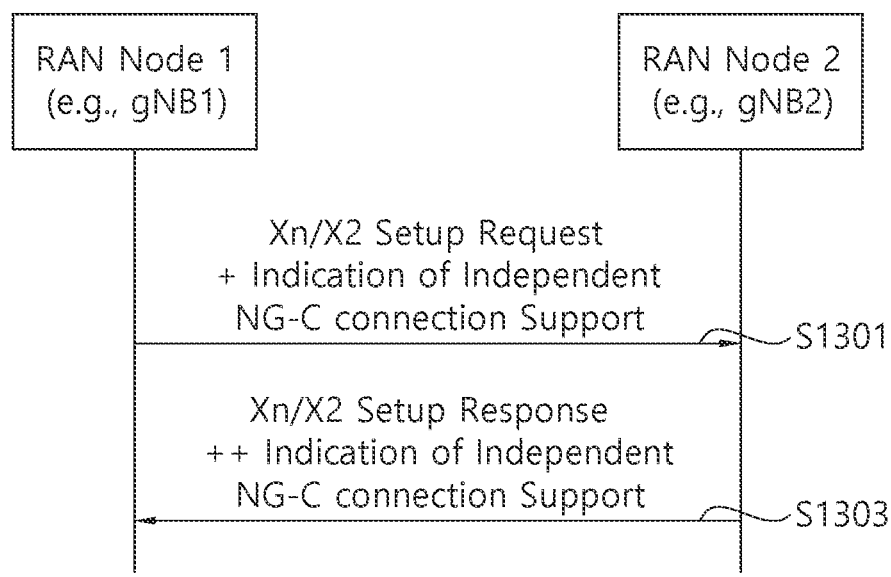
FIG. 13 shows an example of Xn/X2 interface setup procedure according to an embodiment of the present disclosure.

FIG. 13 shows an example of Xn/X2 interface setup procedure according to an embodiment of the present disclosure. The steps illustrated in FIG. 13 may be performed when RAN interface (e.g., Xn/X2 interface) is setup between the RAN nodes.

Referring to FIG. 13, in step S1301, the RAN node 1 may transmit, to a RAN node 2, a Xn/X2 setup request message. The Xn/X2 setup request message may comprise an indication of independent NG-C or S1-Control Plane connection support. That is, the Xn/X2 setup request message may comprise information informing whether an independent control plane connection (e.g., NG-C or S1-control plane connection) to a core network is supported by the RAN node 1.

In step 1303, the RAN node 2 may transmit, to the RAN node 1, a Xn/X2 setup request response message. The Xn/X2 setup request response message may comprise an indication of independent NG-C or S1-Control Plane connection support. That is, the Xn/X2 setup request response message may comprise information informing whether an independent control plane connection (e.g., NG-C or S1-control plane connection) to a core network is supported by the RAN node 2.

Although not illustrated, after the step S1303, the RAN node 1 (e.g., gNB1) and RAN node2 (e.g., gNB2) can take proper action(s) based on the received information. For example, the RAN node can, in a situation where a handover to the other RAN node is needed, determine whether the other RAN node can serve a wireless device as a SN and also can be an independent MN to be handed over to based on the received information. If the received information indicates that the other RAN node can support independent control plane connection to the core network, the RAN node may determine that the other RAN node can serve a wireless device as a SN and also can be an independent MN to be handed over to. On the other hand, if the received information indicates that the other RAN node cannot support independent control plane connection to the core network, the RAN node may determine that the other RAN node cannot be an independent MN to be handed over to. Simultaneous connectivity with source cell and target cell for handover may be a use case to apply.

Figure 14:
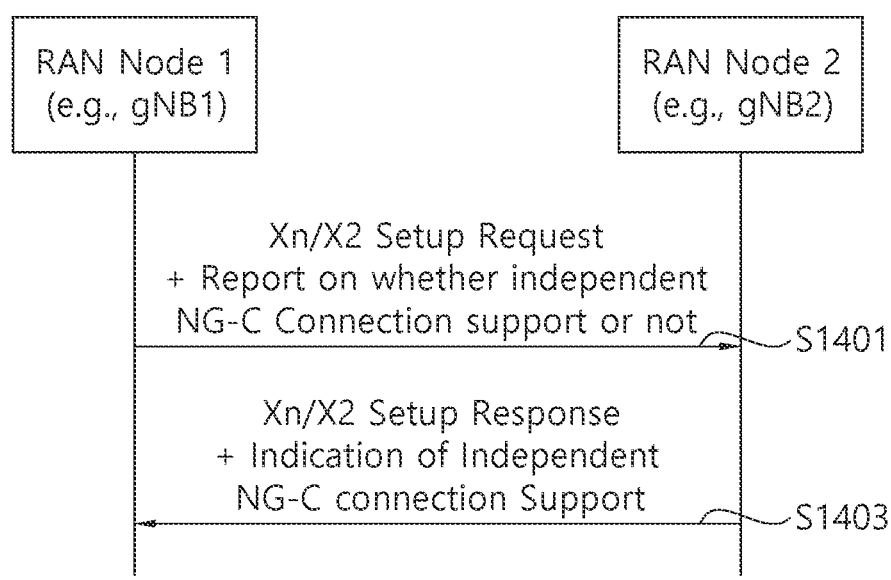
FIG. 14 shows another example of Xn/X2 interface setup procedure according to an embodiment of the present disclosure.

FIG. 14 shows another example of Xn/X2 interface setup procedure according to an embodiment of the present disclosure. The steps illustrated in FIG. 14 may be performed when RAN interface (i.e., Xn/X2 interface) is setup between the RAN nodes.

Referring to FIG. 14, in step S1401, the RAN node 1 may transmit, to the RAN node 2, a Xn/X2 setup request message. The Xn/X2 setup request message may comprise a report on whether independent NG-C or S_1_-Control Plane connection support or not. That is, the Xn/X2 setup request message may comprise a request for reporting whether an independent control plane connection to a core network is supported by the RAN node 2.

In step S1403, the RAN node 2 may transmit, to the RAN node 1, a Xn/X2 setup response message. The Xn/X2 setup response message may comprise indication of independent NG-C or S1-Control Plane connection support. That is, if the RAN node 2 supports independent control plane connection to a core network, the Xn/X2 setup response message may comprise information informing that independent control plane connection to a core network is supported by the RAN node 2. On the other hand, if the RAN node 2 does not support independent control plane connection to a core network, the Xn/X2 setup response message may comprise information informing that independent control plane connection to a core network is not supported by the RAN node 2.

Although not illustrated in FIG. 14, after the step S1403, RAN node 1 (e.g., gNB1) can take proper action(s) based on the received information. For example, the RAN node 1 can, in a situation wherein a handover to the RAN node 2 is needed, determine whether the RAN node 2 can serve the UE as a SN and also can be an independent MN to be handed over to based on the received information. If the received information indicates that the RAN node 2 supports independent control plane connection to a core network, the RAN node 1 may determine that the RAN node 2 can serve the UE as a SN and also can be an independent MN to be handed over to. On the other hand, if the received information indicates that the RAN node 2 cannot support independent control plane connection to a core network, the RAN node 1 may determine that the RAN node 2 cannot be an independent MN to be handed over to. Simultaneous connectivity with source cell and target cell for handover may be a use case to apply.

Figure 15A:
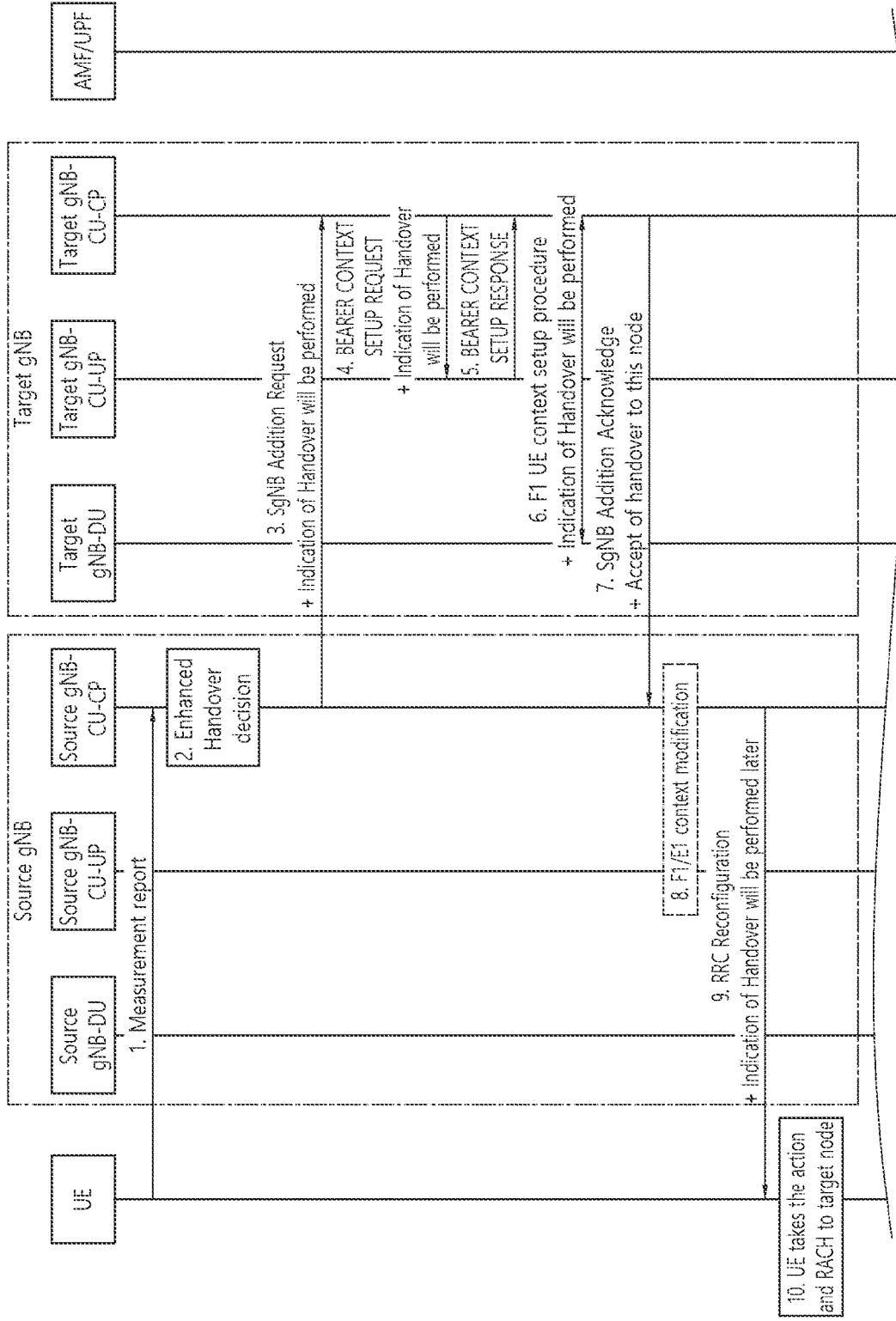
FIGS. 15A-15C show an example of signal flows for an enhanced handover according to an embodiment of the present disclosure.
Figure 15B:
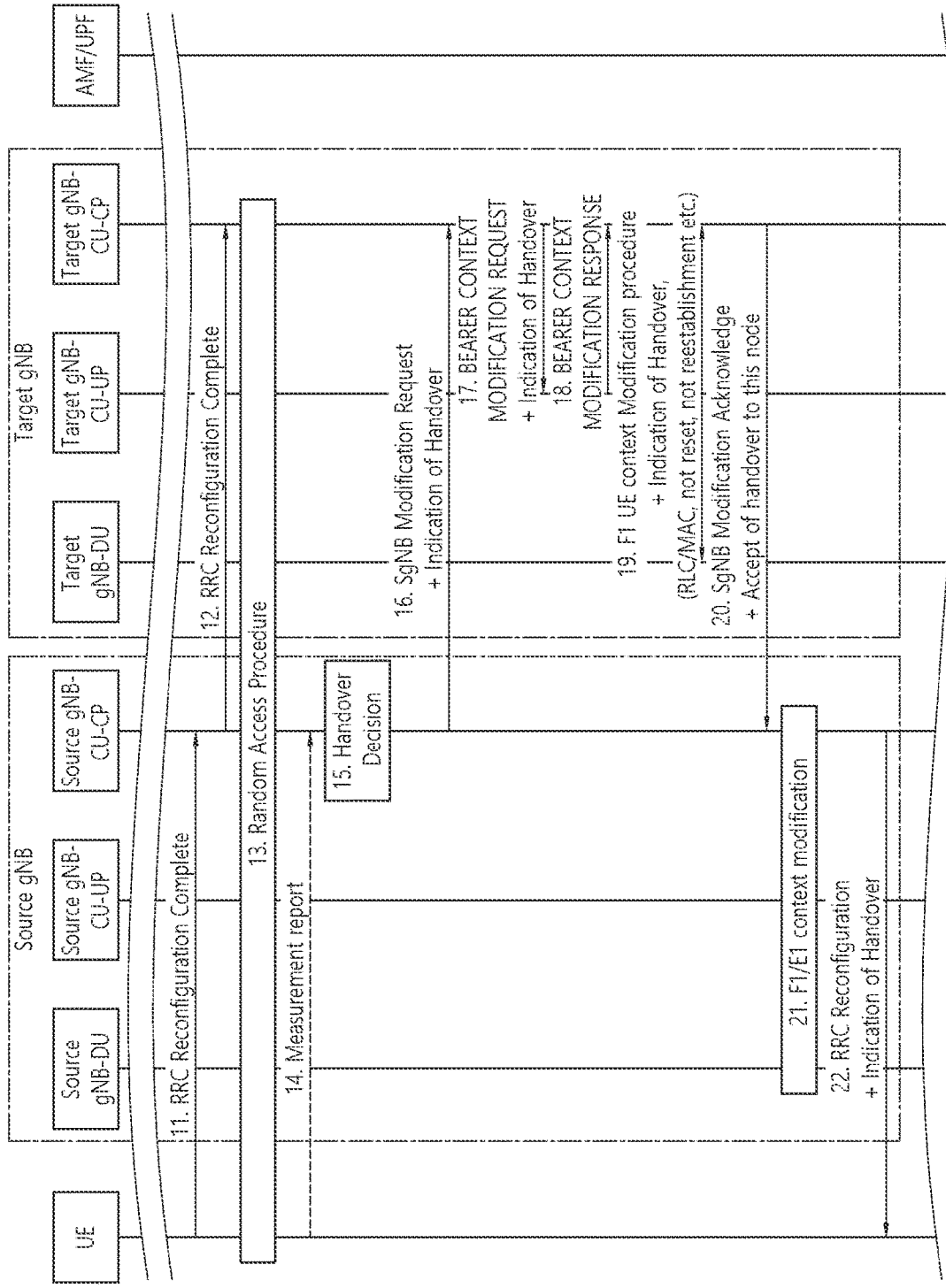
Figure 15C:
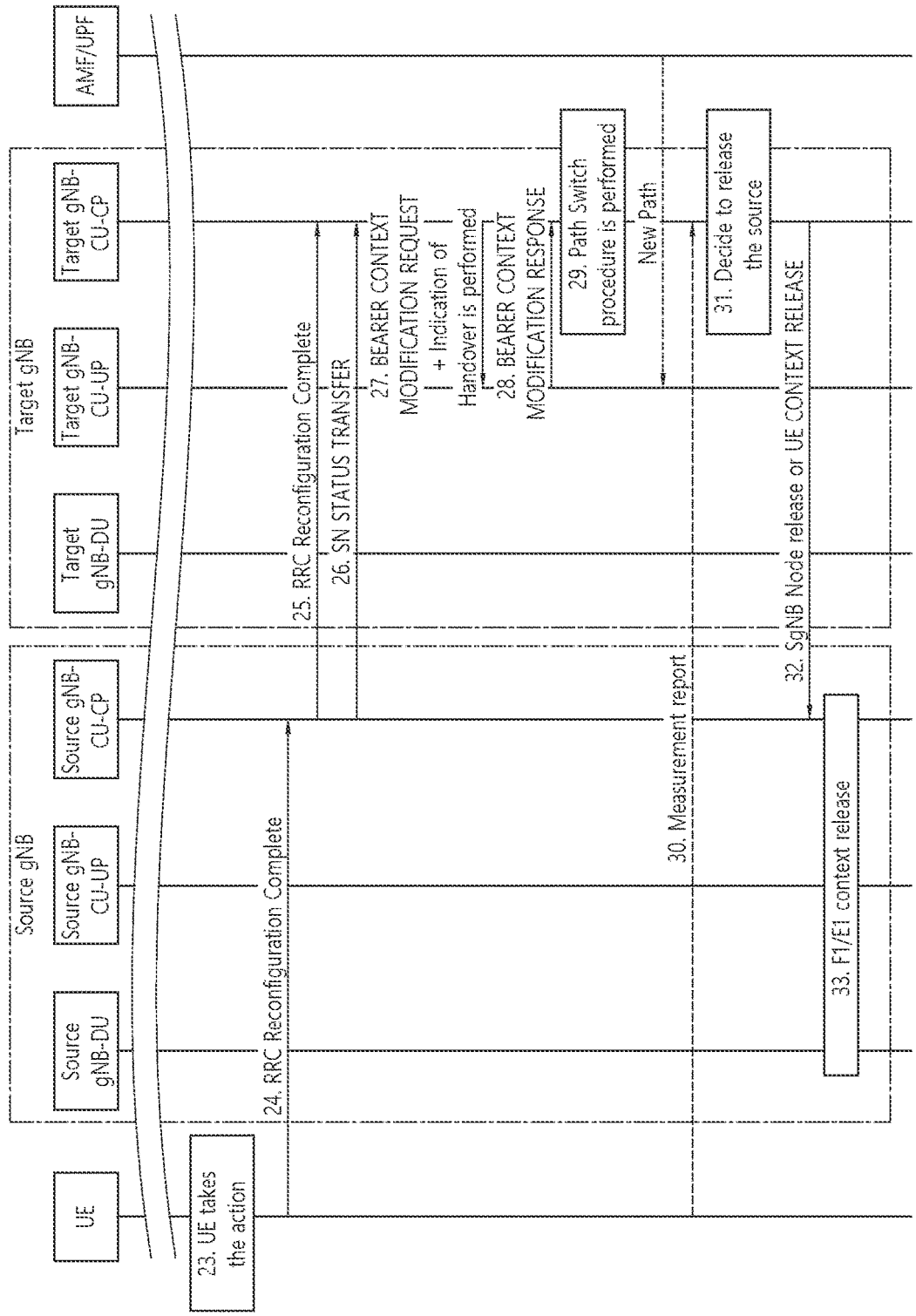

FIGS. 15A-15C show an example of signal flows for an enhanced handover according to an embodiment of the present disclosure. FIGS. 15A-15C illustrate an enhanced handover procedure in which a decision to establish a DC is made first and then a decision to perform a handover is made.

Referring to FIG. 15A, in step 1, the source gNB (or, source gNB CU-CP) may configure UE measurement procedures (e.g., measurement configuration) including a list of candidate cells which the UE can measure. According to the measurement configuration, the UE may report the measurement result for cells which satisfy a handover condition. The UE may transmit a measurement report comprising the measurement result for neighbor cells and/or cells which satisfy a handover condition.

In step 2, the source gNB can make a decision on performing a handover of the UE, based on MeasurementReport and RRM information. The candidate target gNB may be selected based on the measurement report and/or signallings to/from neighbor cells. The source gNB can also make a decision on how to perform the handover. For example, the source gNB can determine to perform a DC procedure first, then handover the UE to target side, and finally release the source node.

In step 3, the source gNB may issue a SgNB addition request message (i.e., SN addition request message) to the target gNB (or, target gNB CU-CP). The SgNB addition request message may comprise at least one of:

Indication that handover will be performed later after the DC procedure, or indication that an enhanced handover considering simultaneous connectivity with source node and target node is to be performed. For example, information element(s) may be used to present the indication(s).

Indication of report on whether independent NG-C or S1-Control Plane connection is supported or not. That is, indication of a request for reporting whether a control plane connection to a core network is supported by the target gNB. For example, information element(s) may be used to present the indication(s).

In step 4, the target gNB CU-CP may transmit a bearer context setup request message to a target gNB CU-UP. The bearer context setup request message may comprise indication that handover will be performed later after the DC procedure, or indication that an enhanced handover considering simultaneous connectivity with source node and target node is to be performed. For example, information element(s) may be used to present the indication(s).

In step 5, the target gNB CU-UP may transmit a bearer context setup response message to the target gNB CU-CP. The bearer context setup response message may comprise an indication of potentially accepting the handover which may be performed later that establishing a simultaneous connectivity with source node and target node.

In step 6, the target gNB CU-CP may issue a F1 UE context setup procedure to the target gNB DU. In the F1 UE context setup procedure, the following information may be transferred from the target gNB CU-CP to the target gNB DU:

Indication that handover will be performed later after the DC procedure, or indication that an enhanced handover considering simultaneous connectivity with source node and target node is to be performed. For example, information element(s) may be used to present the indication(s).

Further, in the F1 UE context setup procedure, the target gNB DU may give a response to the target gNB CU-CP.

In step 7, the target gNB (or, target gNB CU-CP) may issue a SgNB addition response message (i.e., SN addition response message, SN addition request ACK message) to source gNB (or, source gNB CU-CP). The SgNB addition response message may comprise at least one of:

Indication of potentially accepting the handover to be performed later after the DC procedure, or indication that the enhanced handover considering simultaneous connectivity with source node and target node can be accepted. For example, information element(s) may be used to present the indication(s); or Indication that independent NG-C or S1-Control Plane connection to a core network is supported by the target gNB, or indication that independent NG-C or S1-Control Plane connection to a core network is not supported by the target gNB. For example, information element(s) may be used to present the indication(s).

In step 8, the F1/E1 context modification may be performed on the source gNB.

In step 9, the source gNB (or, source gNB CU-CP) may send the RRC connection reconfiguration message to UE. The RRC connection reconfiguration message may comprise an indication that handover will be performed later after the DC procedure, or indication that an enhanced handover considering simultaneous connectivity with source node and target node is to be performed. For example, information element(s) may be used to present the indication(s).

In step 10, the UE may take the corresponding action based on the indication, e.g., to reduce the interruption time. The corresponding action may be different from UE's behavior on a handover which is not based on a DC.

FIG. 15B illustrates steps which continue from the steps illustrated in FIG. 15 A.

Referring to FIG. 15B, in step 11 and 12, the UE may give a response to source gNB through a RRC reconfiguration complete message. The source gNB may forward the RRC reconfiguration complete message or contents of the RRC reconfiguration complete message to the target gNB.

In step 13, Random Access procedure may be performed to the target gNB as secondary node.

In step 14, measurement report can be transmitted from the UE to a source gNB. The step 14 is optional. For example, the source gNB may determine to perform a handover based on the previously received measurement report, and in this case, the step 14 may be omitted.

In step 15, the source gNB can make the decision on handover to the target gNB, which was added as secondary node.

In step 16, the source gNB may trigger the procedure to target gNB by transmitting a message to the target gNB. For example, the message may be a SgNB Modification Request message (or, SN modification request message), handover Request message, or a message of other type. The message may comprise an indication of handover, or indication that an enhanced handover considering simultaneous connectivity with source node and target node is to be performed. For example, information element(s) may be used to present the indication(s).

When receiving the message with indication(s), the target gNB can take actions. For example, the target gNB can know that an enhanced handover considering simultaneous connectivity with source node and target node is to be performed. The target gNB can also prepare the anchor point change (e.g., PDCP anchor change), and control plane RRC procedures for the UE.

In step 17, the target gNB CU-CP can also give, to target gNB CU-UP, an indication of handover, or indication that an enhanced handover considering simultaneous connectivity with source node and target node is to be performed. For example, information element(s) may be used to present the indication(s).

In step 18, the target gNB CU-UP may give a response to gNB CU-CP. The response may comprise an indication of accepting the enhanced handover considering a simultaneous connectivity with source node and target node.

In step 19, the target gNB CU-CP may issue a F1 UE context modification procedure to the target gNB DU. In the F1 UE context modification procedure, the following indication and/or intention may be transferred from the target gNB CU-CP to the target gNB DU:

Indication of handover, or indication that enhanced handover considering simultaneous connectivity with source node and target node is to be performed. For example, information element(s) may be used to present the indication(s); or The intention not to reset or reestablish the RLC resources, MAC resources and/or PHY resources of the target gNB-DU so that the interruption time on mobility can be reduced as much as possible. Or, information instructing not to release the RLC resources, MAC resources and/or PHY resources of the target gNB-DU after the PDCP anchor change. Or, information instructing to maintain/keep the RLC resources, MAC resources and/or PHY resources of the target gNB-DU after the PDCP anchor change.

The target gNB DU may give a response to the target gNB CU-CP.

In step 20, the target gNB (or, target gNB CU-CP) may issue a SgNB modification response message (or, SN modification response message) as a response for the request message transmitted in step 16. The SgNB modification message can be other messages such as handover request ACK message, or other messages). The SgNB modification response message may be sent to source gNB (or, source gNB CU-CP), which may comprise at least one of:

- Indication of accepting the handover, or indication that the enhanced handover considering simultaneous connectivity with source node and target node can be accept. For example, information element(s) may be used to present the indication(s);
- RRC information on the control plane change for the UE due to handover;
- User plane information due to PDCP anchor change; or
- Modified Security information.

In step 21, the F1/E1 context modification may be performed on the source gNB.

In step 22, the source gNB (or, source gNB CU-CP) may send the RRC connection reconfiguration message to UE to perform a RRC connection reconfiguration procedure. The RRC connection reconfiguration message may comprise an indication of handover, or indication that enhanced handover considering simultaneous connectivity with source node and target node is to be performed. For example, information element(s) may be used to present the indication(s).

FIG. 15C illustrates steps which continue from the steps illustrated in FIG. 15B.

Referring to FIG. 15B, in step 23, the UE may take the corresponding action based on the indication, e.g., to reduce the interruption time. The corresponding action may be different from UE's behavior on a handover which is not based on a DC.

In step 24 and 25, the UE may give a response to source gNB through a RRC reconfiguration complete message. The source gNB may forward the RRC reconfiguration complete message or contents of the RRC reconfiguration complete message to the target gNB.

In step 26, SN status transfer can be started for data forwarding due to PDCP anchor change.

In step 27, the target gNB CU-CP may trigger a modification procedure to target gNB CU-UP for data forwarding. The target gNB CU-CP may transmit a bearer context modification request message to the target gNB CU-UP. The bearer context modification request message may comprise an indication of handover, or indication that enhanced handover considering simultaneous connectivity with source node and target node is to be performed. (Other new IEs can also realize the goal). For example, information element(s) may be used to present the indication(s).

In step 28, the target gNB CU-UP may give a response to gNB CU-CP through a bearer context modification response message.

In step 29, the path switch procedure can be performed to the core network.

In step 30, measurement report may be transmitted from the UE to the target gNB. The target gNB may determine whether to release the source gNB based on the measurement report. The step 30 may be optional—that is, if the target gNB determines whether to release the source gNB based on a previously received measurement report, the step 30 may be omitted.

In step 31, the target gNB may determine to release the source gNB.

In step 32, SgNB release message or UE context release message can be used to release the source gNB.

In step 33, the F1/E1 context release may be performed on the source gNB.

The messages used in steps of the FIG. 15 are exemplary. Other messages and/or new message may be defined to realize the same purpose.

Figure 16A:
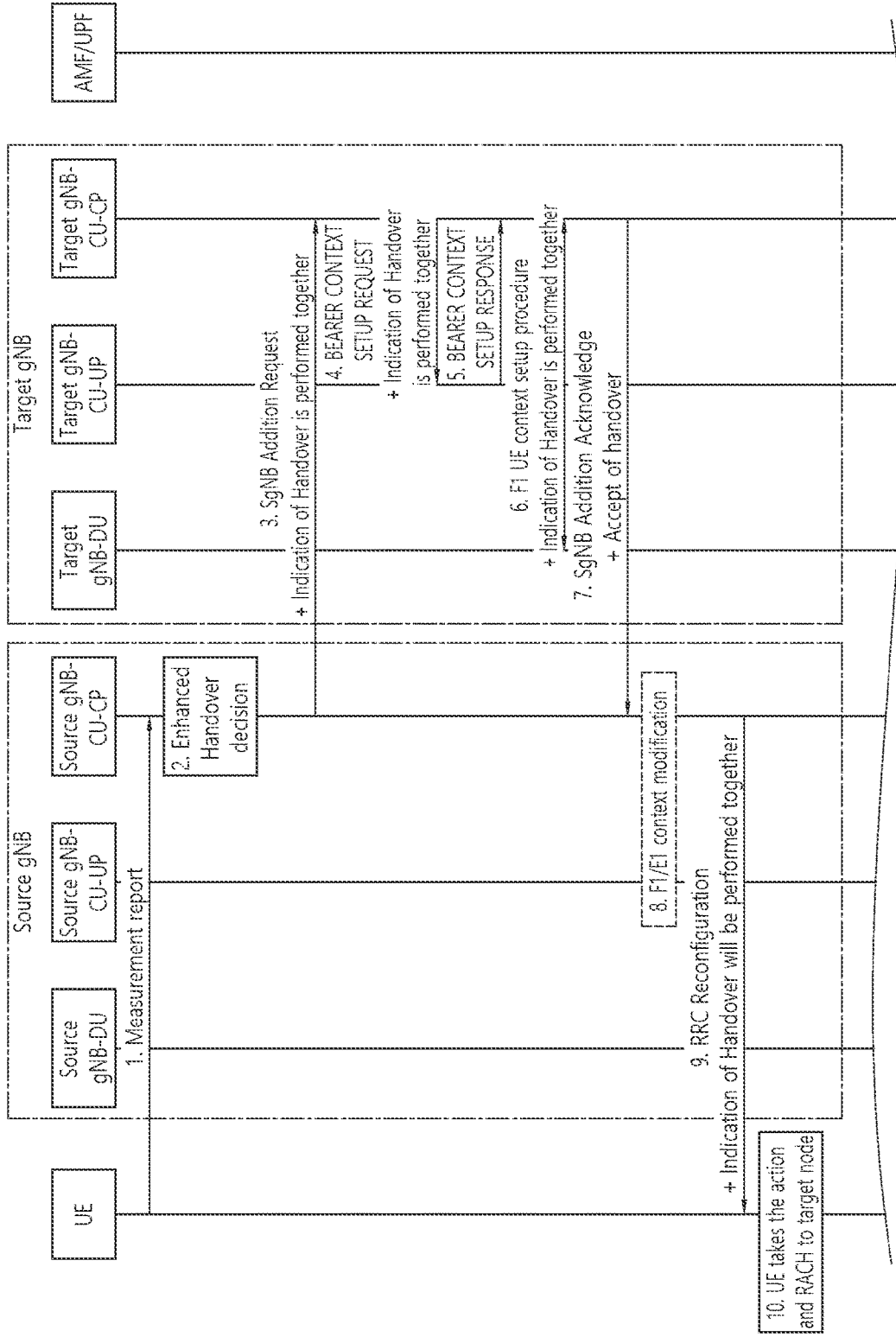
FIGS. 16A-16B show another example of signal flows for an enhanced handover according to an embodiment of the present disclosure.
Figure 16B:
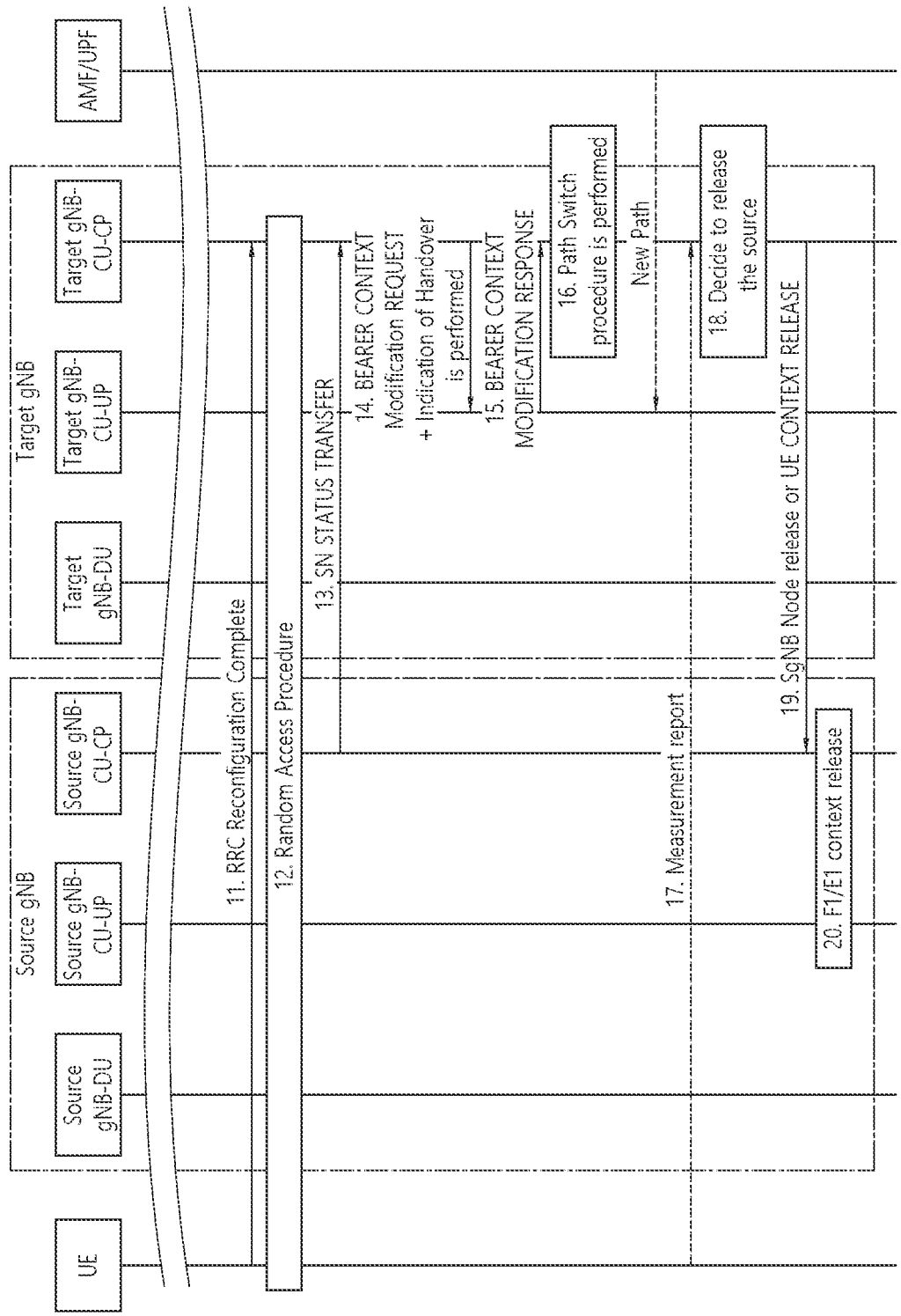

FIGS. 16A-16B show another example of signal flows for an enhanced handover according to an embodiment of the present disclosure. FIGS. 16A-16B illustrate an enhanced handover procedure in which a decision to establish a DC and a decision to perform a handover are made together.

Referring to FIG. 16A, in step 1, the source gNB (or, source gNB CU-CP) may configure UE measurement procedures (e.g., measurement configuration) including a list of candidate cells which the UE can measure. According to the measurement configuration, the UE may report the measurement result for cells which satisfy a handover condition. The UE may transmit a measurement report comprising the measurement result for neighbor cells and/or cells which satisfy a handover condition.

In step 2, the source gNB can make a decision on performing a handover of the UE, based on MeasurementReport and RRM information. The candidate target gNB may be selected based on the measurement report and/or signallings to/from neighbor cells. The source gNB can also make a decision on how to perform the handover. For example, the source gNB can determine to perform a DC procedure and handover procedure for the UE to target side together, and finally release the source node.

In step 3, the source gNB may issue a SgNB addition request message (or, SN addition request message, handover request message, other messages) to the target gNB (or, target gNB CU-CP). The SgNB addition request message may comprise at least one of:

- Indication that handover will be performed later after the DC procedure, or indication that an enhanced handover considering simultaneous connectivity with source node and target node is to be performed. For example, information element(s) may be used to present the indication(s) for i.e., establishing a DC and performing a handover together; or
- Indication of report on whether independent NG-C or S1-Control Plane connection is supported or not. That is, indication of a request for reporting whether a control plane connection to a core network is supported by the target gNB. For example, information element(s) may be used to present the indication(s).

When receiving the message with indication(s), the target gNB can take actions. For example, the target gNB can know that an enhanced handover considering simultaneous connectivity with source node and target node is to be performed. The target gNB can also prepare the anchor point change (e.g., PDCP anchor change), and control plane RRC procedures for the UE.

In step 4, the target gNB CU-CP may transmit a bearer context setup request message to a target gNB CU-UP. The bearer context setup request message may comprise indication that handover will be performed later after the DC procedure, or indication that an enhanced handover considering simultaneous connectivity with source node and target node is to be performed. For example, information element(s) may be used to present the indication(s) for i.e., establishing a DC and performing a handover together.

In step 5, the target gNB CU-UP may transmit a bearer context setup response message to the target gNB CU-CP. The bearer context setup response message may comprise an indication of accepting the establishing a DC and performing a handover together.

In step 6, the target gNB CU-CP may issue a F1 UE context setup procedure to the target gNB DU. In the F1 UE context setup procedure, the following information may be transferred from the target gNB CU-CP to the target gNB DU:

Indication that handover will be performed later after the DC procedure, or indication that an enhanced handover considering simultaneous connectivity with source node and target node is to be performed. For example, information element(s) may be used to present the indication(s) for i.e., establishing a DC and performing a handover together.

Further, in the F1 UE context setup procedure, the target gNB DU may give a response to the target gNB CU-CP.

In step 7, the target gNB (or, target gNB CU-CP) may issue a SgNB addition response message (i.e., SN addition response message, SN addition request ACK message, handover response message and/or other message) to source gNB (or, source gNB CU-CP). The SgNB addition response message may comprise at least one of:

Indication that the enhanced handover considering simultaneous connectivity with source node and target node can be accepted. For example, information element(s) may be used to present the indication(s) for i.e., establishing a DC and performing a handover together;

Indication that independent NG-C or S1-Control Plane connection to a core network is supported by the target gNB, or indication that independent NG-C or S1-Control Plane connection to a core network is not supported by the target gNB. For example, information element(s) may be used to present the indication(s).

RRC information on the control plane change for the UE due to handover;

User plane information due to PDCP anchor change; or

Modified Security information.

In step 8, the F1/E1 context modification may be performed on the source gNB.

In step 9, the source gNB (or, source gNB CU-CP) may send the RRC connection reconfiguration message to UE. The RRC connection reconfiguration message may comprise an indication that an enhanced handover considering simultaneous connectivity with source node and target node is to be performed. For example, information element(s) may be used to present the indication(s) for i.e., establishing a DC and performing a handover together.

In step 10, the UE may take the corresponding action based on the indication, e.g., to reduce the interruption time. The corresponding action may be different from UE's behavior on a handover which is not based on a DC.

FIG. 16B illustrates steps which continue from the steps illustrated in FIG. 16A.

Referring to FIG. 16 A, in step 11, the UE may give a response to the target gNB through a RRC reconfiguration complete message.

In step 12, Random Access procedure may be performed to the target gNB as secondary node.

In step 13, SN status transfer can be started for data forwarding due to PDCP anchor change.

In step 14, the target gNB CU-CP may trigger a modification procedure to target gNB CU-UP for data forwarding. The target gNB CU-CP may transmit a bearer context modification request message to the target gNB CU-UP. The bearer context modification request message may comprise an indication of handover, or indication that enhanced handover considering simultaneous connectivity with source node and target node is to be performed. (Other new IEs can also realize the goal). For example, information element(s) may be used to present the indication(s).

In step 15, the target gNB CU-UP may give a response to gNB CU-CP through a bearer context modification response message.

In step 16, the path switch procedure can be performed to the core network.

In step 17, measurement report may be transmitted from the UE to the target gNB. The target gNB may determine whether to release the source gNB based on the measurement report. The step 30 may be optional—that is, if the target gNB determines whether to release the source gNB based on a previously received measurement report, the step 30 may be omitted.

In step 18, the target gNB may determine to release the source gNB.

In step 19, SgNB release message or UE context release message can be used to release the source gNB.

In step 20, the F1/E1 context release may be performed on the source gNB.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 17:
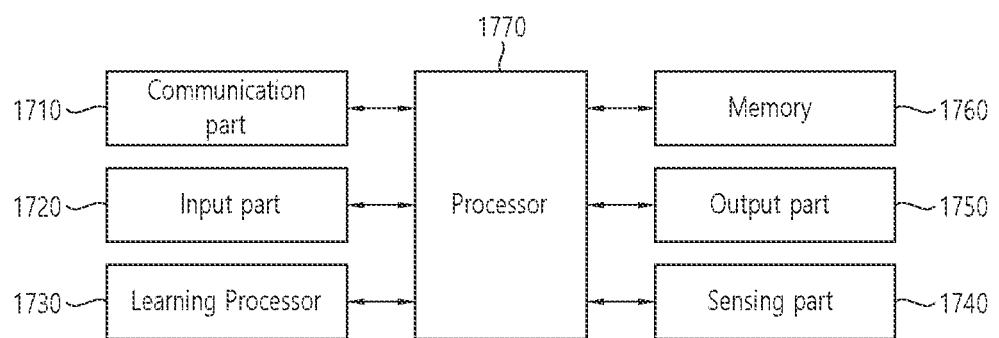
FIG. 17 shows an example of an AI device to which the technical features of the present disclosure can be applied.

FIG. 17 shows an example of an AI device to which the technical features of the present disclosure can be applied.

The AI device 1700 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 17, the AI device 1700 may include a communication part 1710, an input part 1720, a learning processor 1730, a sensing part 1740, an output part 1750, a memory 1760, and a processor 1770.

The communication part 1710 can transmit and/or receive data to and/or from external devices such as the AI devices and the AI server using wire and/or wireless communication technology. For example, the communication part 1710 can transmit and/or receive sensor information, a user input, a learning model, and a control signal with external devices. The communication technology used by the communication part 1710 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1720 can acquire various kinds of data. The input part 1720 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1720 can acquire input data to be used when acquiring an output using learning data and a learning model for model learning. The input part 1720 may obtain raw input data, in which case the processor 1770 or the learning processor 1730 may extract input features by preprocessing the input data.

The learning processor 1730 may learn a model composed of an ANN using learning data. The learned ANN can be referred to as a learning model. The learning model can be used to infer result values for new input data rather than learning data, and the inferred values can be used as a basis for determining which actions to perform. The learning processor 1730 may perform AI processing together with the learning processor of the AI server. The learning processor 1730 may include a memory integrated and/or implemented in the AI device 1700. Alternatively, the learning processor 1730 may be implemented using the memory 1760, an external memory directly coupled to the AI device 1700, and/or a memory maintained in an external device.

The sensing part 1740 may acquire at least one of internal information of the AI device 1700, environment information of the AI device 1700, and/or the user information using various sensors. The sensors included in the sensing part 1740 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1750 may generate an output related to visual, auditory, tactile, etc. The output part 1750 may include a display unit for outputting visual information, a speaker for outputting auditory information, and/or a haptic module for outputting tactile information.

The memory 1760 may store data that supports various functions of the AI device 1700. For example, the memory 1760 may store input data acquired by the input part 1720, learning data, a learning model, a learning history, etc.

The processor 1770 may determine at least one executable operation of the AI device 1700 based on information determined and/or generated using a data analysis algorithm and/or a machine learning algorithm. The processor 1770 may then control the components of the AI device 1700 to perform the determined operation. The processor 1770 may request, retrieve, receive, and/or utilize data in the learning processor 1730 and/or the memory 1760, and may control the components of the AI device 1700 to execute the predicted operation and/or the operation determined to be desirable among the at least one executable operation. The processor 1770 may generate a control signal for controlling the external device, and may transmit the generated control signal to the external device, when the external device needs to be linked to perform the determined operation. The processor 1770 may obtain the intention information for the user input and determine the user's requirements based on the obtained intention information. The processor 1770 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1730 and/or learned by the learning processor of the AI server, and/or learned by their distributed processing. The processor 1770 may collect history information including the operation contents of the AI device 1700 and/or the user's feedback on the operation, etc. The processor 1770 may store the collected history information in the memory 1760 and/or the learning processor 1730, and/or transmit to an external device such as the AI server. The collected history information can be used to update the learning model. The processor 1770 may control at least some of the components of AI device 1700 to drive an application program stored in memory 1760. Furthermore, the processor 1770 may operate two or more of the components included in the AI device 1700 in combination with each other for driving the application program.

Figure 18:
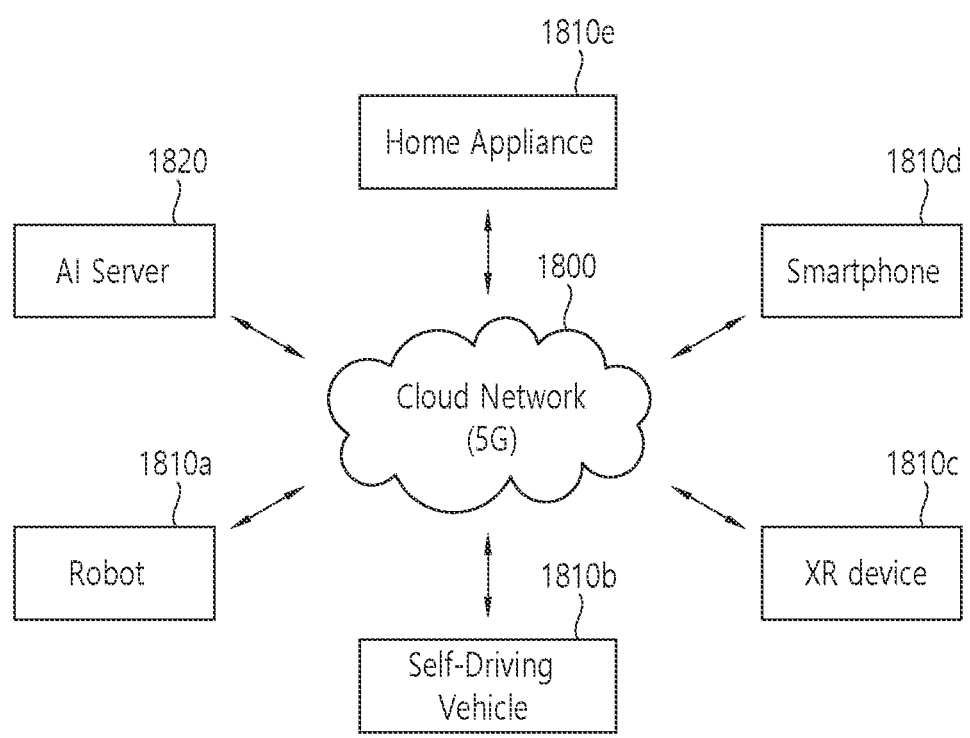
FIG. 18 shows an example of an AI system to which the technical features of the present disclosure can be applied.

FIG. 18 shows an example of an AI system to which the technical features of the present disclosure can be applied.

Referring to FIG. 18, in the AI system, at least one of an AI server 1820, a robot 1810a, an autonomous vehicle 1810b, an XR device 1810c, a smartphone 1810d and/or a home appliance 1810e is connected to a cloud network 1800. The robot 1810a, the autonomous vehicle 1810b, the XR device 1810c, the smartphone 1810d, and/or the home appliance 1810e to which the AI technology is applied may be referred to as AI devices 1810a to 1810e.

The cloud network 1800 may refer to a network that forms part of a cloud computing infrastructure and/or resides in a cloud computing infrastructure. The cloud network 1800 may be configured using a 3G network, a 4G or LTE network, and/or a 5G network. That is, each of the devices 1810a to 1810e and 1820 consisting the AI system may be connected to each other through the cloud network 1800. In particular, each of the devices 1810a to 1810e and 1820 may communicate with each other through a base station, but may directly communicate with each other without using a base station.

The AI server 1820 may include a server for performing AI processing and a server for performing operations on big data. The AI server 1820 is connected to at least one or more of AI devices constituting the AI system, i.e. the robot 1810a, the autonomous vehicle 1810b, the XR device 1810c, the smartphone 1810d and/or the home appliance 1810e through the cloud network 1800, and may assist at least some AI processing of the connected AI devices 1810a to 1810e. The AI server 1820 can learn the ANN according to the machine learning algorithm on behalf of the AI devices 1810a to 1810e, and can directly store the learning models and/or transmit them to the AI devices 1810a to 1810e. The AI server 1820 may receive the input data from the AI devices 1810a to 1810e, infer the result value with respect to the received input data using the learning model, generate a response and/or a control command based on the inferred result value, and transmit the generated data to the AI devices 1810a to 1810e. Alternatively, the AI devices 1810a to 1810e may directly infer a result value for the input data using a learning model, and generate a response and/or a control command based on the inferred result value.

Various embodiments of the AI devices 1810a to 1810e to which the technical features of the present disclosure can be applied will be described. The AI devices 1810a to 1810e shown in FIG. 18 can be seen as specific embodiments of the AI device 1700 shown in FIG. 17.

The present disclosure can have various advantageous effects.

For example, various embodiments of the present disclosure may provide solutions to make UE's experience better by reducing an interruption time during mobility in a way of, for example, supporting simultaneous connectivity with source cell and target cell. Therefore, better UE experience on handover can be realized in a wireless communication system (e.g., NR). The solutions to reduce an interruption time in a handover and/or a secondary cell group (SCG) change may be also beneficial to high mobility situations such as high speed trains and/or aerial use case where channel situations becomes challenging in terms of handover performance.

Various embodiments of the present disclosure can be applied to both inter-/intra frequency handover and/or SCG change. Further, various embodiments of the present disclosure may not be limited to a high frequency range.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a target base station for a mobility of a user equipment (UE) from a source base station, the method comprising:
   receiving, by a central unit (CU)-control plane (CP) of the target base station from the source base station, a request message comprising a notification that a dual connection-based mobility is requested,
   wherein the dual connection-based mobility is a mobility that maintains a connection with the source base station until releasing the connection with the source base station after a random access to the target base station;
   transmitting, by the CU-CP of the target base station to a CU-user plane (UP) of the target base station, a bearer context setup request message comprising a notification that the dual connection-based mobility is requested;
   receiving, by the CU-CP of the target base station from the CU-UP of the target base station, a bearer context setup response message;
   transmitting, by the CU-CP of the target base station to the source base station, a response message for the request message, the response message comprising a notification that the dual connection-based mobility is accepted;
   performing the random access with the UE; and
   transmitting, by the CU-CP of the target base station to the source base station, a UE context release message related to releasing a UE context in the source base station, after performing the random access with the UE.

2. The method of claim 1, wherein the target base station supports a control plane connection to a core network.

3. The method of claim 1, wherein the request message comprises a secondary node (SN) addition request message, and
   wherein the response message comprises a SN addition request acknowledgement (ACK) message.

4. The method of claim 3, wherein the SN addition request message comprises the notification that the dual connection-based mobility is requested.

5. The method of claim 3, wherein the SN addition request message comprises a request for reporting whether a control plane connection to a core network is supported by the target base station.

6. The method of claim 1, further comprising:
   receiving, from the source base station, a setup request message for setting up an interface between the target base station and the source base station; and
   transmitting, to the source base station, a setup response message for the request message.

7. The method of claim 6, wherein the setup request message comprises information informing whether a control plane connection to a core network is supported by the source base station, and wherein the setup response message comprises information informing whether the control plane connection to the core network is supported by the target base station.

8. The method of claim 6, wherein the setup request message comprises a request for reporting whether a control plane connection to a core network is supported by the target base station, and wherein the setup response message comprises information informing whether the control plane connection to the core network is supported by the target base station.

9. The method of claim 1, further comprising transmitting, by the CU-CP of the target base station to a distributed unit (DU) of the target base station, an instruction of maintaining resources related to the DU of the target base station after the random access to the target base station, wherein the resources comprise at least one of physical layer (PHY) resources, media access control (MAC) layer resources, or radio link control (RLC) layer resources.

10. The method of claim 1, further comprising:

transmitting, to the source base station, a message for requesting a release of resources allocated by the source base station.

11. A target base station for a mobility of a user equipment (UE) from a source base station, comprising:

a transceiver;

a memory; and at least one processor operatively coupled to the transceiver and the memory, wherein the memory stores instructions that, based on being executed by the at least one processor, perform operations comprising:

receiving, by a central unit (CU)-control plane (CP) of the target base station from the source base station, a request message comprising a notification that a dual connection-based mobility is requested, wherein the dual connection-based mobility is a mobility that maintains a connection with the source base station until releasing the connection with the source base station after a random access to the target base station;

transmitting, by the CU-CP of the target base station to a CU-user plane (UP) of the target base station, a bearer context setup request message comprising a notification that the dual connection-based mobility is requested;

receiving, by the CU-CP of the target base station from the CU-UP of the target base station, a bearer context setup response message;

transmitting, by the CU-CP of the target base station to the source base station, a response message for the request message, the response message comprising a notification that the dual connection-based mobility is accepted;

performing the random access with the UE; and transmitting, by the CU-CP of the target base station to the source base station, a UE context release message related to releasing a UE context in the source base station, after performing the random access with the UE.

* * * * *